(12) United States Patent   (10) Patent No.: US 7,657,794 B2
Ichikawa et al.   (45) Date of Patent: Feb. 2, 2010

(54) DATA STORAGE DEVICE AND ERROR RECOVERY METHOD

(75) Inventors: Masatoshi Ichikawa, Kanagawa (JP);
Akira Kojima, Kanagawa (JP);
Yoshinori Makita, Kanagawa (JP);
Kazunari Kose, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 438 days.

(21) Appl. No.: 11/444,604

(22) Filed: May 31, 2006

(65) Prior Publication Data
US 2006/0271809 A1 Nov. 30, 2006

(30) Foreign Application Priority Data
May 31, 2005 (JP) ............................. 2005-159755

(51) Int. Cl.
*G06F 11/00* (2006.01)
(52) U.S. Cl. ....................................................... 714/42
(58) Field of Classification Search ..................... 714/2, 714/5, 8, 15, 16, 39, 42, 48, 54, 763, 769
See application file for complete search history.

(56) References Cited
U.S. PATENT DOCUMENTS

| | | | |
|---|---|---|---|
| 5,748,880 A * | 5/1998 | Ito et al. | ......................... 714/46 |
| 6,084,733 A | 7/2000 | Ohzeki et al. | |
| 6,122,235 A | 9/2000 | Arai | |
| 6,345,366 B1 | 2/2002 | Asano et al. | |
| 6,625,755 B1 * | 9/2003 | Hirata et al. | ................... 714/17 |
| 6,687,194 B1 | 2/2004 | Kobayashi et al. | |
| 6,834,257 B2 * | 12/2004 | Keller | ......................... 702/183 |
| 6,862,151 B2 * | 3/2005 | Hoskins et al. | ................ 360/53 |
| 6,883,126 B1 * | 4/2005 | Herman et al. | .............. 714/723 |
| 6,918,054 B2 * | 7/2005 | Hirata et al. | ................... 714/17 |
| 2002/0057510 A1 * | 5/2002 | Hoskins et al. | ................ 360/53 |
| 2003/0196147 A1 * | 10/2003 | Hirata et al. | ................... 714/42 |
| 2005/0229052 A1 * | 10/2005 | Brahmadathan et al. | ..... 714/724 |

FOREIGN PATENT DOCUMENTS

JP    11-065778    3/1999
JP    2001-014811  1/2001

* cited by examiner

*Primary Examiner*—Nadeem Iqbal
(74) *Attorney, Agent, or Firm*—Townsend and Townsend and Crew LLP; Patrick Duncan

(57) ABSTRACT

Embodiments of the invention provide an error recovery scheme that allows a data read/write error in a data storage device to be processed within a short time, and a data storage device that attempts error recovery using the error recovery scheme. In one embodiment, a data storage device conducts an error recovery process for a data access error in accordance with an error recovery procedure having multiple error recovery steps; the data storage device including a head that accesses a data region of a user data storage medium, and a controller that controls the error recovery process by using not only address information of the sector where the access error to the data region has occurred, but also an error recovery log which has address information of the data region and past error recovery information associated with the latter address information.

18 Claims, 25 Drawing Sheets

x : action applied

| Retry count | Parameters varied | Dummy Write | ECC Correction |
|---|---|---|---|
| 1 | Retry with default parameters | - | - |
| 2 - 3 | Change Track offset | - | - |
| 4 - 7 | Change Read parameters | - | - |
| 8 - 9 | Change Read parameters & Track offset | - | - |
| 10 - 13 | Change Read parameters | - | - |
| 14 | Dummy Write | x | - |
| 15 - 20 | Change Read parameters | - | - |
| 21 - 24 | Change Read parameters & Track offset | - | - |
| 25 - 28 | Change Read parameters | - | - |
| 29 | Change Read parameters | - | x |
| 32 - 35 | Change Read parameters & Track offset | - | x |
| 36 | Change Read parameter | - | x |
| 37 - 144 | Repeat the above 1 through 36 | | |

(b)

x : action applied

| Retry count | Parameters varied | Dummy Write |
|---|---|---|
| 1 - 5 | Retry with default parameters | - |
| 6 | Change Track offset | x |
| 7 - 36 | Retry with default parameters | - |
| 37 - 144 | Repeat the above 1 through 36 | |

DATA STORAGE DEVICE AND ERROR RECOVERY METHOD

CROSS-REFERENCES TO RELATED APPLICATIONS

This application claims priority from Japanese Patent Application No. JP2005-159755, filed May 31, 2005, the entire disclosure of which is incorporated herein by reference.

BACKGROUND OF THE INVENTION

The present invention relates to data storage devices and error recovery methods, and more particularly, to order of execution control of error recovery steps in error recovery procedures.

As recording density improves, the frequency of occurrence of an error recovery process in a data storage device due to data read/write errors therein is increased.

Traditionally, the required error recovery procedures each consisting of plural steps have been stored and retained in data storage devices, and in case of a data read error or a data write error, the plural steps of the error recovery procedure are executed in the required order to attempt error recovery.

Along with the improvements in the processing speeds and reliability of computer systems in recent years, data storage devices are also restricted in terms of time by the host computer or storage control apparatus connected as a host. In addition, the error recovery procedures within such a data storage device are provided for by recovery time limits. The data storage device requires error recovery by executing the error recovery procedures efficiently within the recovery time limits.

Regarding how to improve the efficiency of error recovery and reduce an error recovery time, a solution by considering the execution time of each step in the error recovery procedure and changing the order of execution of the steps and a retrial count so that error recovery can be processed within recovery time limits is proposed in, for example, Patent Document 1 (Japanese Patent Laid-Open No. Hei 11-065778).

BRIEF SUMMARY OF THE INVENTION

Because Patent Document 1 assumes using all time provided for by recovery time limits, the solution described in Patent Document 1 does not lead to reduction in the time required for error recovery. Also, the order of error recovery is determined from the execution time required of error recovery in individual steps, and this means that these steps are not arranged in order in terms of processing efficiency.

Therefore, a feature of the present invention is to propose an error recovery scheme that allows data read/write errors in a data storage device to be processed within a short time. Another feature of the present invention is to provide a data storage device that uses the above mentioned error recovery scheme to attempt error recovery if a reading error or a writing error occurs in data whose writing or reading has been requested from a host computer or a storage control apparatus.

A data storage device according to an aspect of the present invention conducts an error recovery process for a data access error in accordance with an error recovery procedure which has a plurality of error recovery steps, wherein the data storage device includes: a head that accesses a data region of a medium for storage of user data; and a controller for controlling the error recovery process for an access error to the data region by using not only address information of a sector at which the access error has occurred, but also an error recovery log which has address information of the data region and past error recovery information associated with the address information of the data region.

In a data recovery scheme according to another aspect of the present invention, an error recovery method for conducting an error recovery process for a data access error in accordance with an error recovery procedure which has a plurality of error recovery steps, wherein the method includes: storing an error recovery log that has address information of a data region for storage of user data, and past error recovery information associated with the address information; and determining execution order of error recovery steps against an access error to the data region by using address information of a sector at which the access error has occurred, and the error recovery log.

Determining from address by address log information an error recovery action to be first conducted against a read/write error makes it possible to conduct an error recovery process in the order of the possibility of error recovery, thus allowing rapid and efficient recovery from errors.

BRIEF DESCRIPTION OF THE DRAWINGS

FIGS. 2(a) and 2(b) are examples of the tables that show different details of the recovery actions taken in each step of an error recovery procedure in the data storage system of the first embodiment.

DETAILED DESCRIPTION OF THE INVENTION

First Embodiment

The steps of error recovery procedures effective for error recovery differ according to the data storage device used. Even within the same data storage device, these steps also differ according to the address where the error has occurred. In addition, the steps are considered to differ according to the particular operating environment such as time and temperature.

In the present embodiment, therefore, an address at which an error occurred, a read or write request from the host computer or storage control apparatus connected as a host, the step number of an error recovery procedure where the error was recovered, and the frequency of error recovery are combined into and stored as one set of log information.

If an error occurs in data for which a reading or writing request has been issued, the above log information is referred to and based on judgments from the address at which the error has occurred, and from the reading or writing request, an error recovery procedural step higher in the frequency of error recovery is executed first. Thus, the error recovery process is conducted efficiently and error recovery is attempted.

Also, in the present embodiment, a head number is used to denote the address at which the error occurred. That is, execution order of the step is determined using the same log information for a sector associated with the same head number. Control of the error recovery procedure by use of the log information associated with the address can also be applied to a data storage device that conducts only reading or writing.

Figure 1:
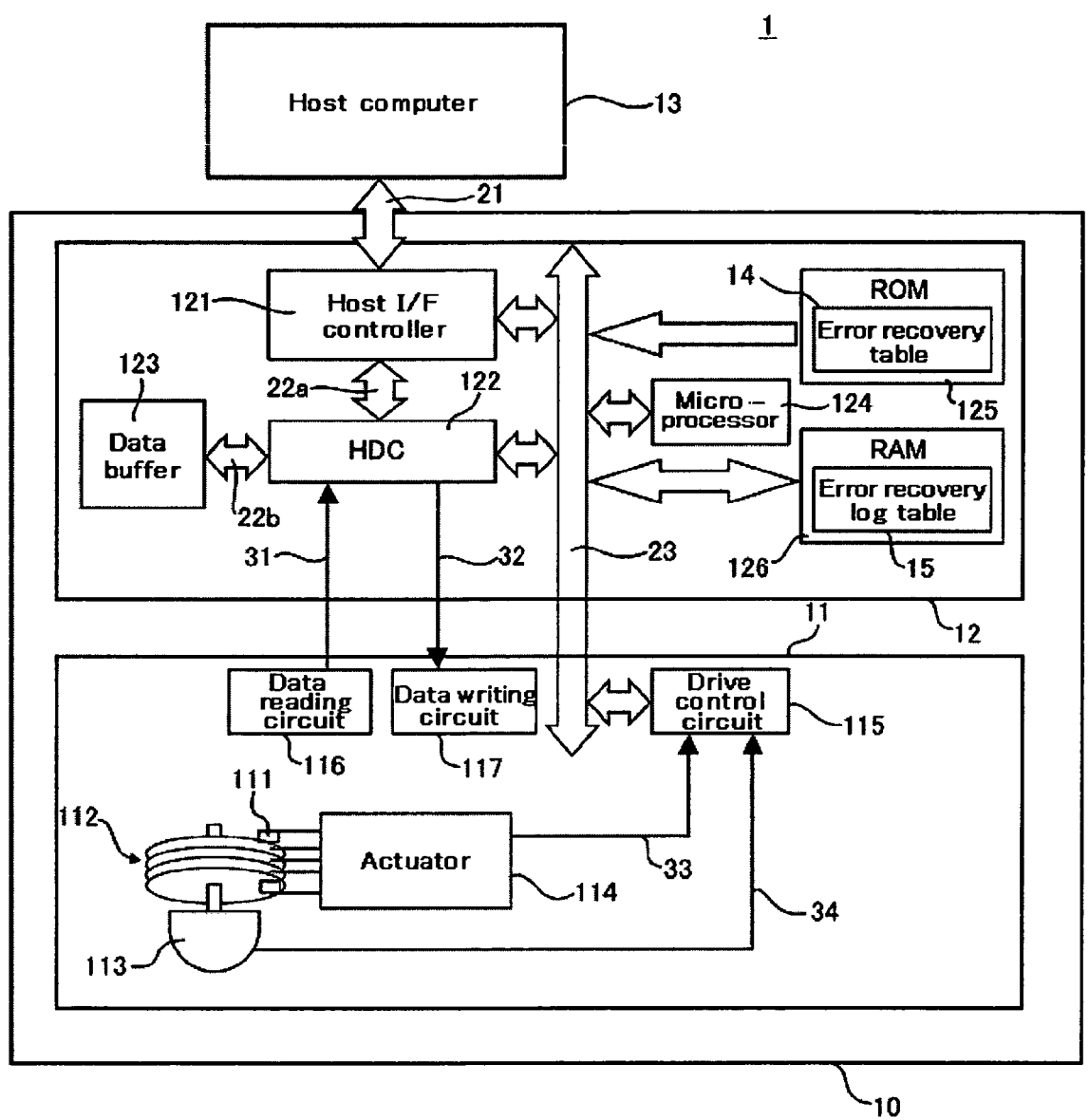
FIG. 1 is a configuration diagram of a data storage system according to a first embodiment.

FIG. 1 shows a configuration diagram of a data storage system 1 according to the present embodiment. The data storage system 1 has a data storage device 10 and a host computer 13, and the data storage device 10 and the host computer 13 are connected by a host I/F 21. Examples in which a hard disk drive with a magnetic disk as a user data storage medium is used as a data storage device are described in the following embodiments.

The Fiber Channel that is commonly used as a standard I/F between a computer and a storage device is used as the host I/F 21. ULP (Upper Layer Protocol) of the Fiber Channel is of SCSI specifications.

The data storage device 10 has a drive 11 and a data storage device controller 12. The drive 11 has at least one head 111 for writing and reading data, at least one disk 112, a spindle motor 113 for rotating the disk 112, an actuator 114 for moving the head 111 to a desired position above the disk 112, a drive control circuit 115 that conducts positioning control of the head 111 by controlling rotation of the spindle motor 113 and controlling movement of the actuator 114, a data reading circuit 116, and a data writing circuit 117.

The drive control circuit 115 uses an actuator control signal 33 to control the movement of the actuator 114, and a spindle motor control signal 34 to control the rotation of the spindle motor 113. Data read/write addresses within the drive 11 are specified in sets, each set consisting of a cylinder number, a head number, and a sector number.

Additionally, data storage regions within the drive 11 are broadly divided into system management areas and data areas. The information required for the data storage device 10 to operate, and management information are stored in the system management areas. The types of information stored in the system management areas are, for example, the number of heads 111, the number of disks 112, and other configuration information on the drive 11, the programs executed by an internal microprocessor 124 of the data storage device controller 12, the information necessary to execute the programs, Mode Page Parameters of SCSI, a defect list, and others.

For a Power On Reset process, for instance, the information within the system management areas is read out into the data storage device controller 12 as required. The data areas are used to store and retain the user data exchanged between the host computer 13 and the data storage device 10. Each data area is further divided into 15 zones each including a plurality of cylinders. Some of the zones differ in recording density of data and in the number of sectors in each cylinder.

The data storage device controller 12 has a host I/F controller 121, an HDC 122, a data buffer 123, a microprocessor 124, a ROM 125, and a RAM 126. The data storage device controller 12 also has 32 bit data buses 22a and 22b for data transfer between the host computer 13 and the drive 11, and a 16 bit control bus 23 for the microprocessor 124 to control various sections. A read signal 31 that is transmitted from the data reading circuit 116 to the HDC 122, and a write signal 32 that is transmitted from the HDC 122 to the data writing circuit 117 are further present.

The host I/F controller 121 is a circuit that controls the host I/F 21, and the host I/F controller 121 is also a circuit that controls data exchange between the host computer 13 and the data storage device 10. The HDC 122 controls data exchange between the host I/F controller 121 and the data buffer 123, data writing into the drive 11, and data reading from the drive 11.

The data buffer 123 absorbs differences in data transfer rate between the host I/F 21 and the drive 11. The microprocessor 124 uses the 16 bit control bus 23 to supervise and control the data storage device controller 12. The microprocessor 124 also interprets and executes the SCSI commands received from the host computer 13 via the host I/F 21, and controls data flow between the host computer 13 and the data storage device 10.

The microprocessor 124 uses the control bus 23 to give a data transfer instruction to the host I/F controller 121 and the HDC 122, and then the host I/F controller 121 and the HDC 122 control data transfer, whereby the control of data flow is accomplished.

The ROM 125 is, for example, a 512 KB flash memory for storing the programs that the microprocessor 124 executes. The RAM 126 is, for example, a 512 KB SRAM, and this memory is used as a work memory for the microprocessor 124 to execute the programs.

The host computer 13 uses a WRITE command, one of SCSI commands, to request the data storage device 10 to write in data, and uses a READ command, one of SCSI commands, to request the data storage device 10 to read out data. A time limit on the error recovery within the data storage device 10 is defined by the Recovery Time Limit specified on Mode Parameter Page 1h of SCSI.

When the host computer 13 issues the WRITE command to the data storage device 10 to request data writing, the requested data is transferred from the host computer 13 via the host I/F 21 and then stored into the data buffer 123 via the host I/F controller 121 and the HDC 122.

Furthermore, after redundant data such as ECC has been added to it by the HDC 122, the above data is converted from a parallel data format into a serial data format. Thus converted data is transferred from the HDC 122 to the data writing circuit 116 within the drive 11, as the write signal 32.

The drive control circuit 115 moves the head 111 to a desired address by controlling the actuator 114, and then the data writing circuit 117 stores the above data into the desired address. This address is indicated by identification numbers of the appropriate cylinder, head, and sector on the disk 112.

When the host computer 13 issues the READ command to the data storage device 10 to request data reading, the drive control circuit 115 moves the head 111 to a desired address by controlling the actuator 114 and then the data reading circuit 116 reads out the read signal 31. After this, the read signal 31 is transferred to the HDC 122, which then uses ECC and other redundant data to confirm that the read signal 31 has been correctly read out.

After that, the redundant data is removed from the read signal 31. This signal is then reconverted from the serial data format into the parallel data format, and the parallel data is stored into the data buffer 123. The stored data within the data buffer 123 is transferred to the host computer 13 via the HDC 122, the host I/F controller 121, and the host I/F 21.

When the above mentioned READ or WRITE command is executed, a data read/write error may occur. If the error actually happens, the HDC 122 conducts an error recovery process whereby the data is read or written properly or until the time limit on the error recovery within the data storage device expires.

FIGS. 2(a) and 2(b) are examples of the tables that show different details of the recovery actions taken in each step of an error recovery procedure. The data storage device 10 has an error recovery procedure to be used for a data read error, and an error recovery procedure to be used for a data write error. The former procedure is shown in FIG. 2(a), and the latter, in FIG. 2(b). Both procedures are independent of each other.

There are various kinds of recovery processes, and the HDC 122 conducts error recovery actions in accordance with an error recovery procedure in which a plurality of recovery processes are arranged for each step. In a normal case, an error recovery process for a step whose step number is 1 is conducted and it is detected whether data reading/writing is conducted properly in accordance with the error recovery process for the step of step number 1.

At this time, if data reading/writing is not conducted properly, an error recovery process for a step whose step number is 2 will be conducted. In this manner, in numerical order of the error recovery steps defined in the error recovery procedure, the HDC 122 conducts the error recovery process whereby the data is read or written properly or until the time limit on the error recovery within the data storage device expires.

In each step of the above error recovery procedure, the data storage device 10 modifies settings of the data reading circuit 116 and the data writing circuit 117, and an off track quantity between the head 111 and the read/write track, and retries data reading or writing, whereby the data has been read or written properly or until the time limit on the error recovery within the data storage device expires. Error recovery is thus attempted to ensure normal data reading/writing.

At this time, if an error occurs during data reading/writing, the data storage device 10 according to the present embodiment first executes the error recovery step of the error recovery procedural step in which the error recovery has successfully been conducted for the error recently encountered for the head number and the SCSI command.

The data storage device 10 has error recovery tables 14 in the internal ROM 125 of the data storage device controller 12, and error recovery log tables 15 in the RAM 126. A step number and an address of a function which the microprocessor 124 executes for that step number are stored and retained in the appropriate error recovery table 14. The error recovery tables 14 in the data storage device 10 are independently stored and retained for data read error recovery and data write error recovery respectively.

Figure 3:
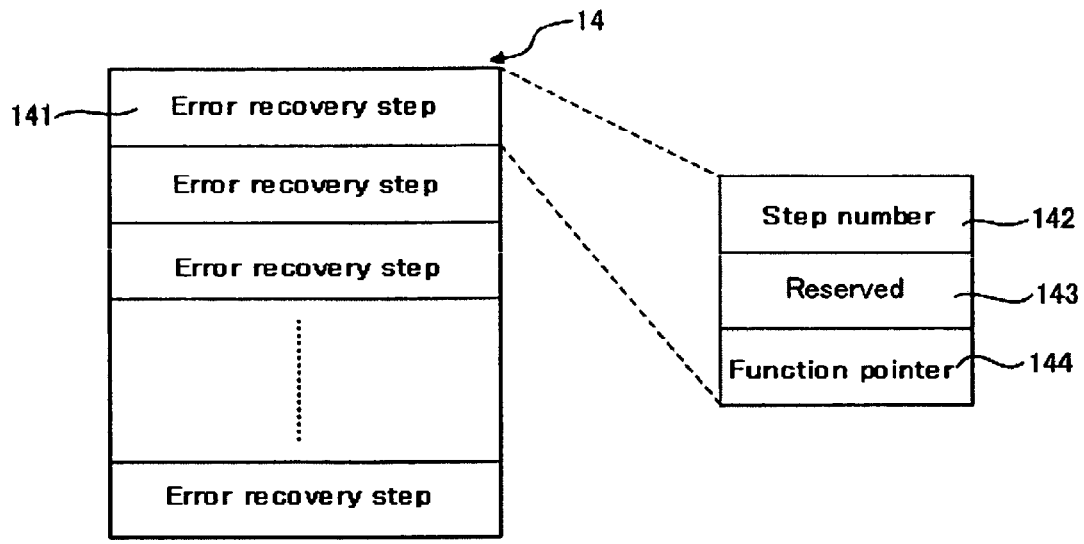
FIG. 3 is a construction diagram of an error recovery table in the data storage system of the first embodiment.

FIG. 3 shows an example of table construction of an error recovery table 14. The error recovery table 14 is constructed of more error recovery steps 141 than the number of step numbers in the error recovery procedure, and, for example, 48 error recovery steps 141 can be registered. Each error recovery step 141 includes a step number 142 and a function pointer 144. As shown in FIG. 3, an error recovery step 141 consisting of eight bytes, for example, has a two byte step number 142, and a two byte Reserved region 143, and a four byte function pointer 144.

The step number 142 is a region for storing and retaining the numbers of each step of the error recovery procedure. The function pointer 144 is a region for storing and retaining addresses of the functions executed by the microprocessor 124 in each step of the error recovery procedure. The Reserved region 143 is a region reserved to conduct adjustments for a four byte split format. The step number 142 takes 1 as its minimum value, and the error recovery steps 141 are arranged in the order of the step number 142.

If a data read/write error occurs, the microprocessor 124 selects the appropriate error recovery table 14 according to the associated read/write command. After the selection, the function of the address indicated by the function pointer 144 appropriate for the step number 142 in the error recovery procedure is executed in accordance with the particular step number 142 and then each step of the error recovery procedure is executed independently.

In the data storage device 10 according to the present embodiment, the microprocessor 124 determines from log information an error recovery action of a step number of a step to be first executed against a data read/write error, as an error recovery step to be first executed. Next, the error recovery step immediately following the above error recovery step of the error recovery procedure is executed to conduct an error recovery process. If log information associated with the address where the error has occurred is absent, error recovery actions are conducted within a time limit, in the order of the step number with an error recovery action of step number 1 of the error recovery procedure first.

In the data storage device 10 according to the present embodiment, error recovery log tables 15 are arranged in the internal RAM 126 of the data storage device controller 12. The address at which the error occurred, the SCSI command (READ command or WRITE command), the step number of the error recovery procedure where the error recovery action was executed, the frequency of error recovery are stored as one set of log information in each error recovery log table 15. An error recovery log table 15 to be used for data read error recovery, and an error recovery log table 15 to be used for data write error recovery are provided independently.

In the data storage device 10 according to the present embodiment, only a head number is used as the address at which the error occurred. Only the head number is used because different methods of error recovery are usually used for different faces of magnetic disks and thus because the error recovery process can be optimized by dividing the methods of error recovery according to head number.

Figure 4:
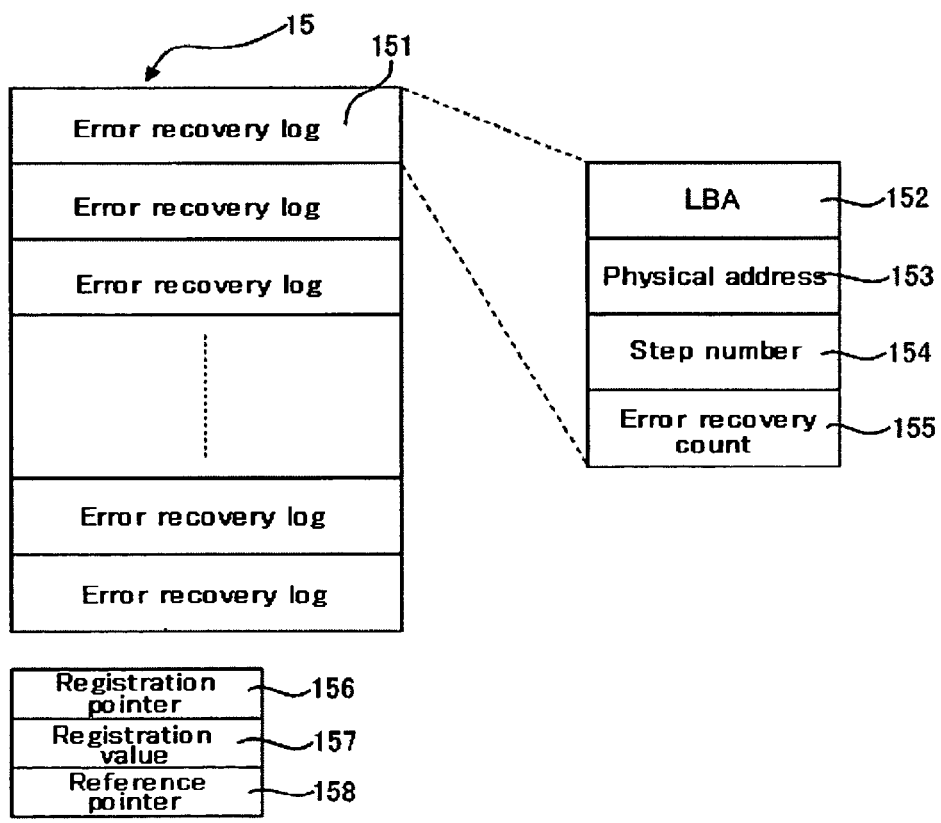
FIG. 4 is a table construction diagram of an error recovery log table in the data storage system of the first embodiment.

FIG. 4 shows an example of table construction of an error recovery log table 15. A plurality of error recovery logs 151 can be registered in the error recovery log table 15. For example, 48 error recovery logs 151 can be registered.

The error recovery log table 15 also has an LBA (Logical Block Address) 152 indicative of an LBA at which the error occurred, a physical address 153 indicating the address at which the error occurred, the step number 154 in the error recovery procedure where the error that occurred at the physical address 153 was successfully corrected by error recovery, and an error recovery count 155 indicating how often the error at the physical address 153 was successfully corrected by the error recovery in the step number 154 of the error recovery procedure.

The microprocessor 124 uses registration pointers 156, registration counts 157, and reference pointers 158, to refer to and update the error recovery log table 15. The registration pointers 156, registration counts 157, and reference pointers 158 arranged are each divided into two types: for data reading from the error recovery log table 15, and for data writing thereinto.

When new log information is registered, addresses for writing are stored in each registration pointer 156. Each registration count 157 indicates the number of error recovery logs 151 registered in the error recovery log table 15. Addresses of the error recovery logs 151 of the error recovery log table 15 that are to be referred to are stored in each reference pointer 158. For example, the registration pointer 156 is a four byte pointer, the registration count 157 is a two byte variable, and the reference pointer 158 is a four byte pointer.

The error recovery log table 15 is registered or updated when the data read error or the data write error is successfully corrected by error recovery. Also, each time the error recovery log table 15 is registered or updated, its contents are written into a system management area of the drive 11. In addition, during the Power On Reset process, the contents of the error recovery log table 15 are read out from the system management area of the drive 11 and disposed in the RAM 126.

Figure 5:
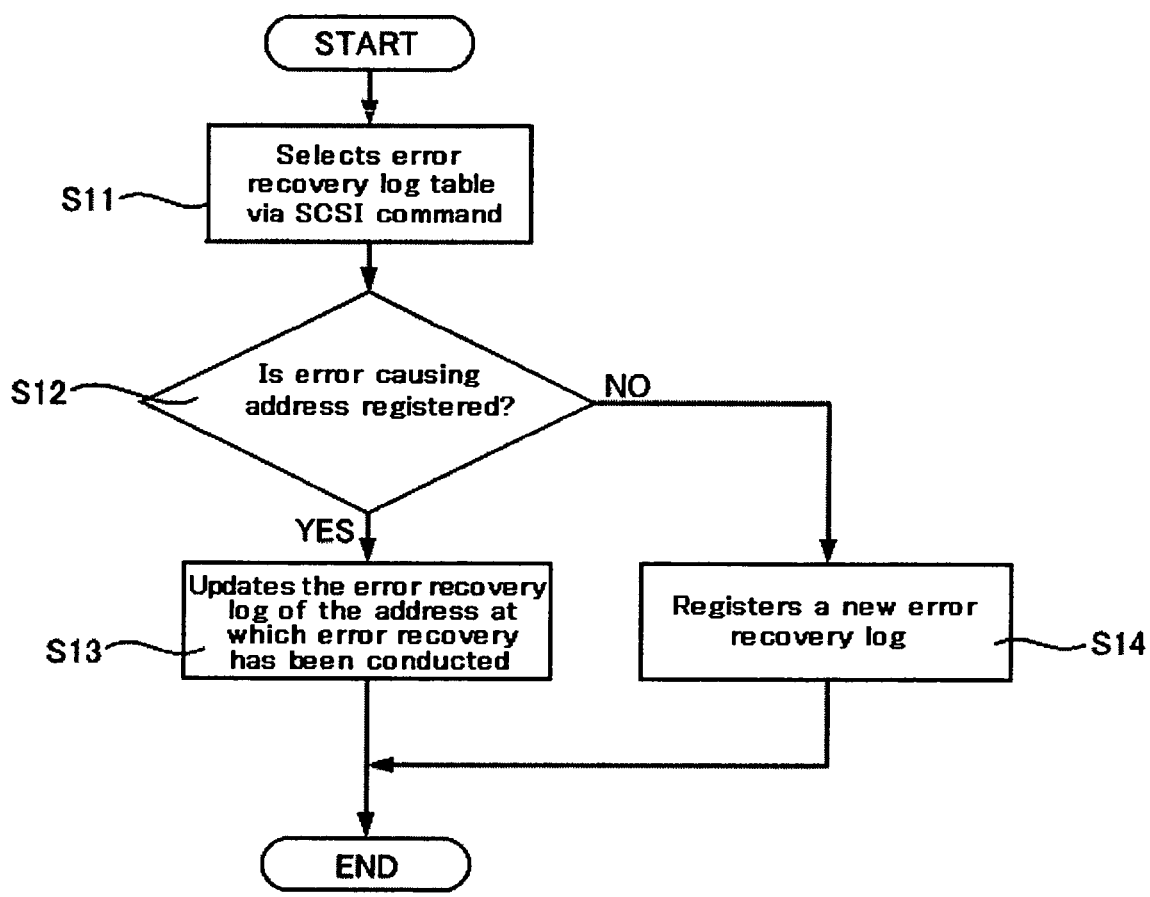
FIG. 5 is a flowchart of registering and updating process steps for an error recovery log table in the data storage system of the first embodiment.

In the present embodiment, for one physical address 153, one error recovery log 151 only is stored into the error recovery log table 15. This allows error recovery process efficiency to be raised without using a large memory capacity in changing the order of the error recovery. A flowchart of registering and updating process steps for an error recovery log table is shown in FIG. 5.

First, when a data read/write error is successfully corrected by error recovery, an error recovery log table 15 to be newly registered or updated is selected in step S11 according to the type of SCSI command associated with the data read/write error. If the SCSI command is the READ command, the error recovery log table 15 to be used for data read error recovery is selected. If the SCSI command is the WRITE command, the error recovery log table 15 to be used for data write error recovery is selected.

Next, it is judged in step S12 whether the error recovery log 151 associated with the address at which the error occurred is registered in the error recovery log table 15. If the error recovery log 151 associated with the above address is registered, the error recovery log 151 is correspondingly updated in step S13. If the above error recovery log 151 is not registered, a new error recovery log 151 is registered in step S14.

Figure 6:
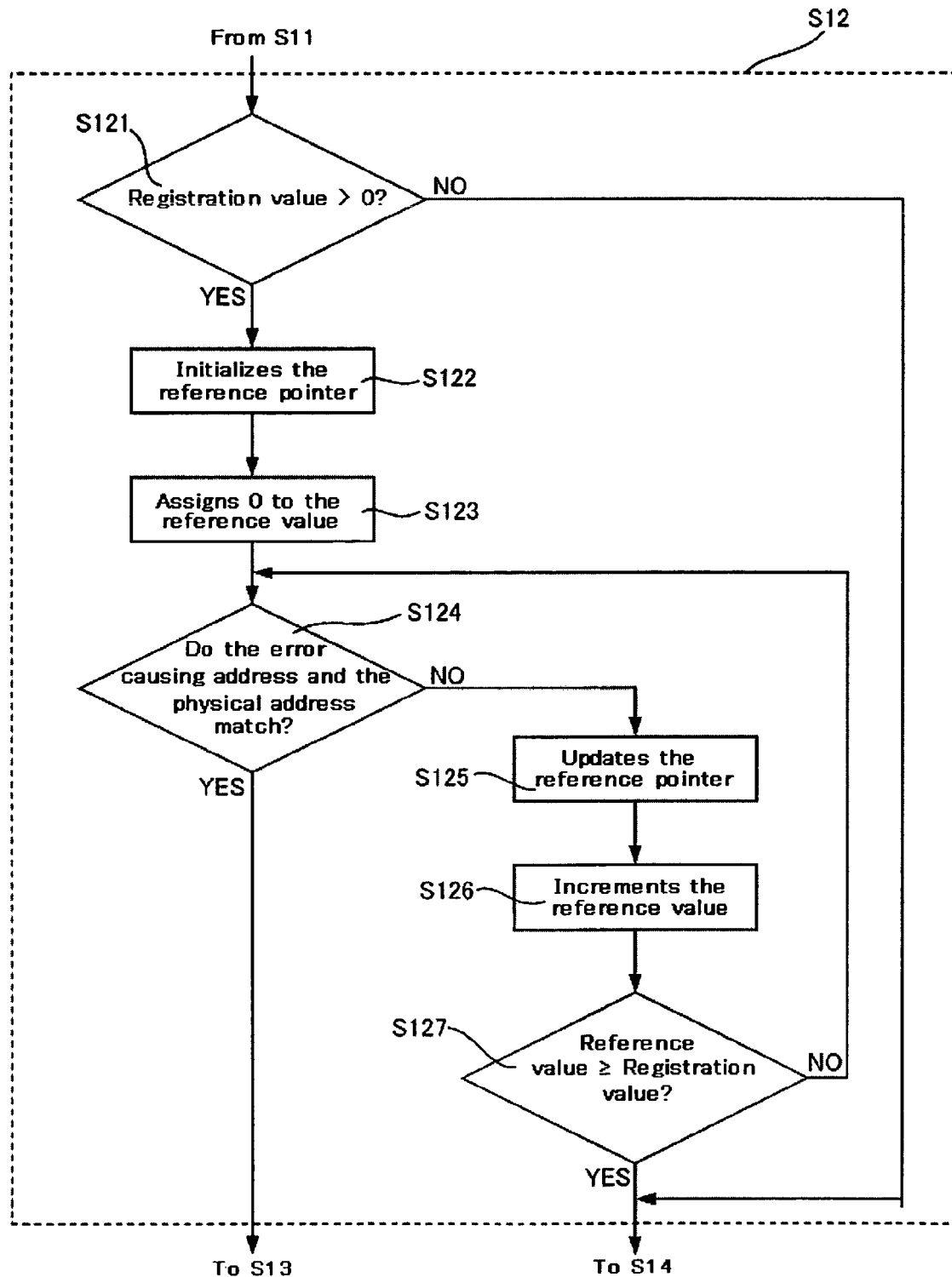
FIG. 6 is a flowchart of judging whether an error recovery log associated with an address at which a data read/write error occurred is registered in the error recovery log table in the data storage system of the first embodiment.

The process step of judging whether the error recovery log 151 associated with the address at which the data read/write error occurred in step S12 is registered in the error recovery log table 15 is described in further detail below. FIG. 6 is a flowchart of judging whether the error recovery log 151 associated with the address at which the data read/write error occurred is registered in the error recovery log table 15.

The judgment of whether the error recovery log 151 associated with the address at which the data read/write error occurred is registered in the error recovery log table 15 uses a reference count for storing the number of error recovery logs 151 to which reference was made. The reference count is temporarily disposed in the RAM 26.

First, the registration count 157 is referred to and whether one or more error recovery logs 151 are registered in the error recovery log table 15 is judged. If no error recovery logs 151 are registered in the error recovery log table 15, the error recovery log 151 associated with the address at which the error occurred is judged to be absent, and transfer of process control to step S14 follows in step S121.

If one or more error recovery logs 151 are registered, the reference pointer 158 is initialized in step S122. The initialization here refers to resetting the reference pointer 158 to a first address within the error recovery log table 15. The reference count is also reset to 0 in step S123.

Next, the address where the error occurred, and the physical address 153 within the error recovery log 151 indicated by the reference pointer 158 are compared in step S124. In the present embodiment, since a head number is stored in the physical address 153, a comparison is conducted between the head number where the error occurred, and the physical address 153 within the error recovery log 151 indicated by the reference pointer 158.

If the address where the error occurred, and the physical address 153 match, the error recovery log 151 associated with the address at which the error occurred is judged to be registered in the error recovery log table 15, and control proceeds to step S13.

If the address where the error occurred, and the physical address 153 within the error recovery log 151 indicated by the reference pointer 158 do not match, the reference pointer 158 is correspondingly updated in step S125. Next, 1 is added to the reference count and this new count is stored in step S126. The after addition reference count and the registration count 157 are compared in step S127. This process step is conducted to judge whether reference has been made to all error recovery logs registered in the error recovery log table 15.

If the reference count is smaller than the registration count 157, control is returned to immediate front of step S124, and the same process is conducted in that step. If the reference count is equal to or greater than the registration count 157, the error recovery log 151 associated with the address at which the error occurred is judged not to have been registered in the error recovery log table 15, and control proceeds to step S14.

Figure 7:
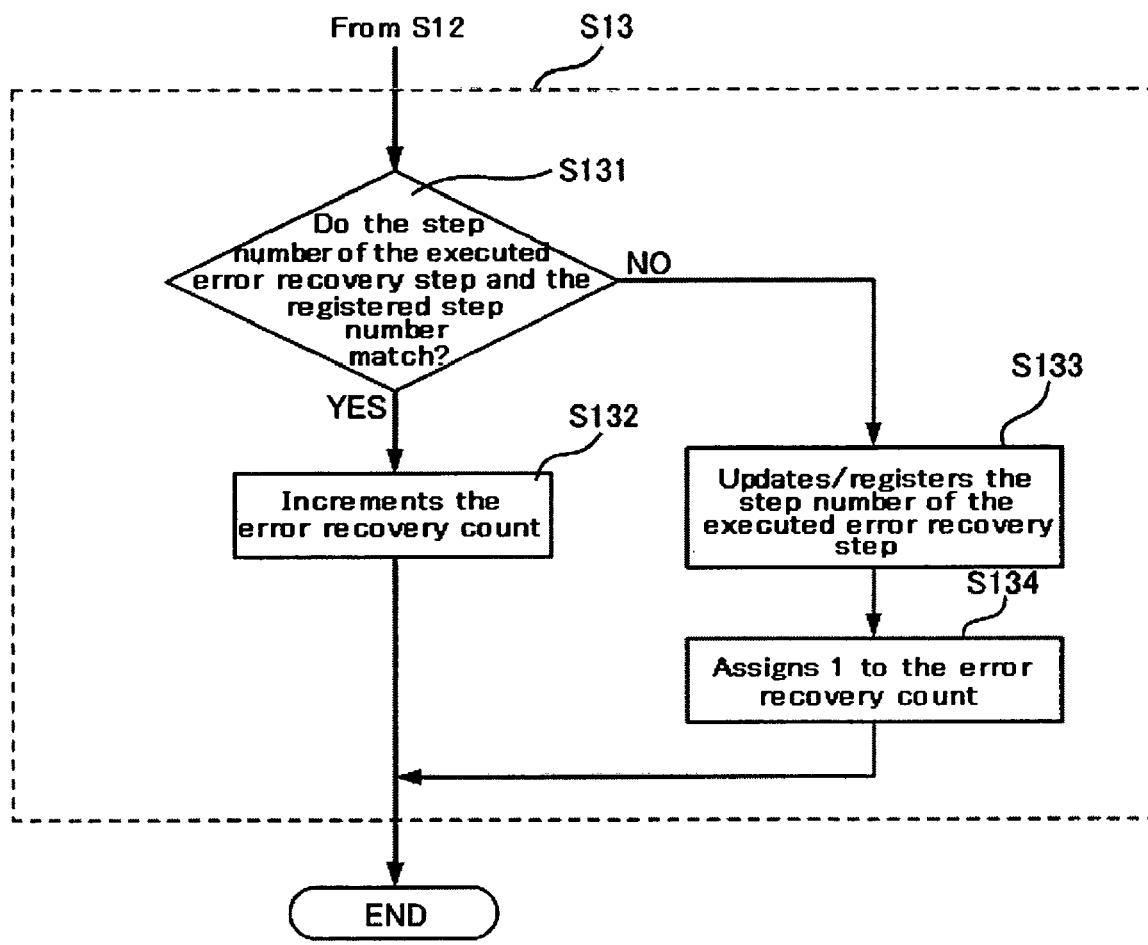
FIG. 7 is a flowchart of the updating process for the error recovery log in the data storage system of the first embodiment.

The updating of the error recovery log 151 in step S13 for the address at which the error recovery was conducted is described next. A flowchart of the updating of the error recovery log 151 is shown in FIG. 7. The data storage device 10 according to the present embodiment is constructed so that for one physical address 153, one error recovery log 151 only is registered in the error recovery log table 15.

First, the step number where the error was successfully corrected by error recovery, and registered step number 154 are compared in step S131. If both step numbers match, the value obtained by adding 1 to the value which has been stored as the error recovery count 155 is stored as a new error recovery count 155 in step S132. If both step numbers do not match, the step number where the error was successfully corrected by error recovery is stored instead of the step number 154, in step S133, and then 1 is stored in the error recovery count 155.

Figure 8:
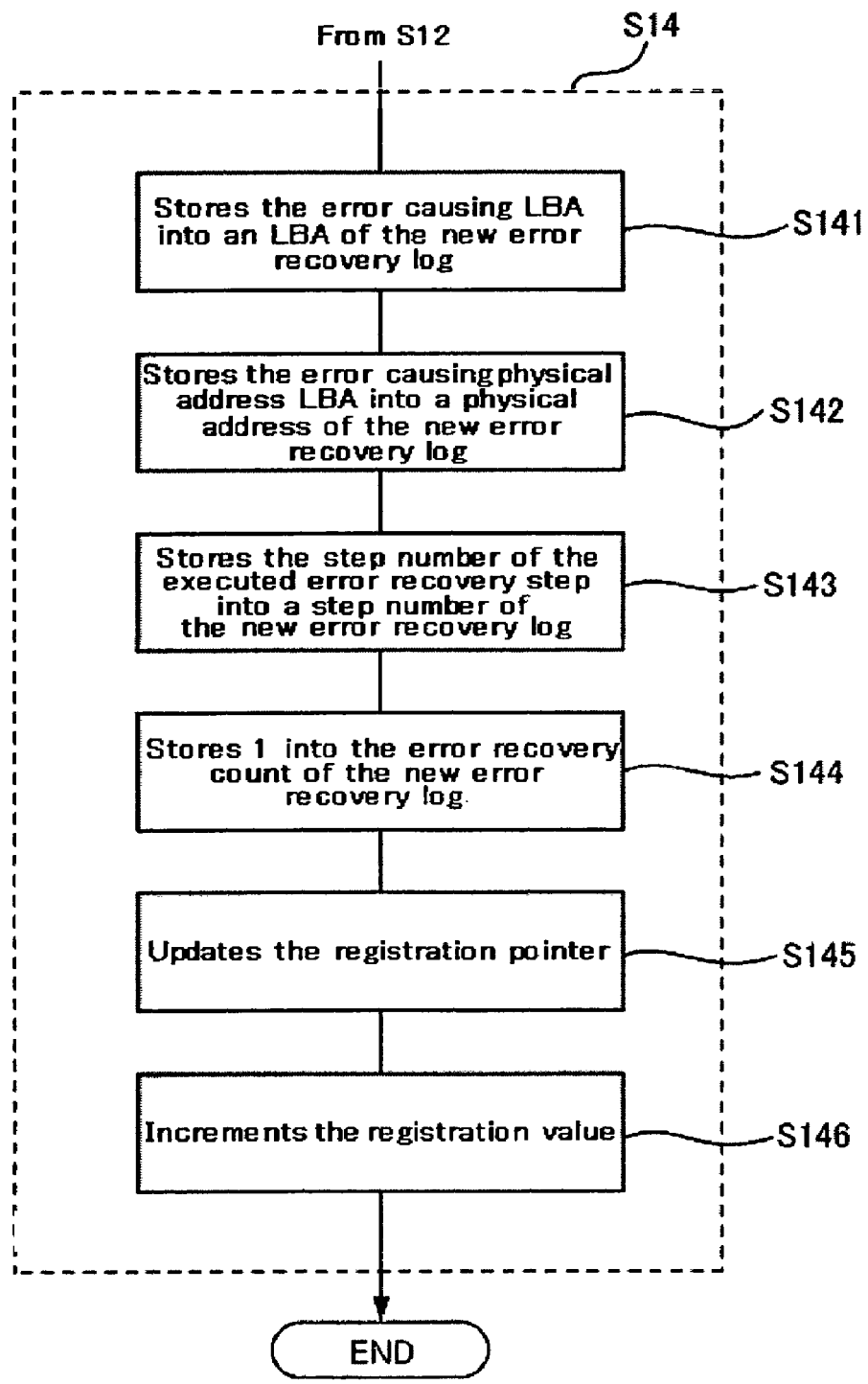
FIG. 8 is a flowchart of registering a new error recovery log in the data storage system of the first embodiment.

Next, the registration of a new error recovery log 151 in step S14 is described in detail below. A flowchart of registering a new error recovery log 151 is shown in FIG. 8.

In the error recovery log 151 that the registration pointer 156 indicates, the LBA where the error occurred, the physical address where the error occurred, the step number where the error was corrected by error recovery, and 1 are stored in LBA 152 (step S141), in physical address 153 (step S142), in step number 154 (step S143), and in error recovery count 155 (step S144) respectively. Next, the registration pointer 156 is updated (step S145) and the value obtained by adding 1 to the value which has been stored in the registration pointer 156 is stored (step S146).

Figure 9:
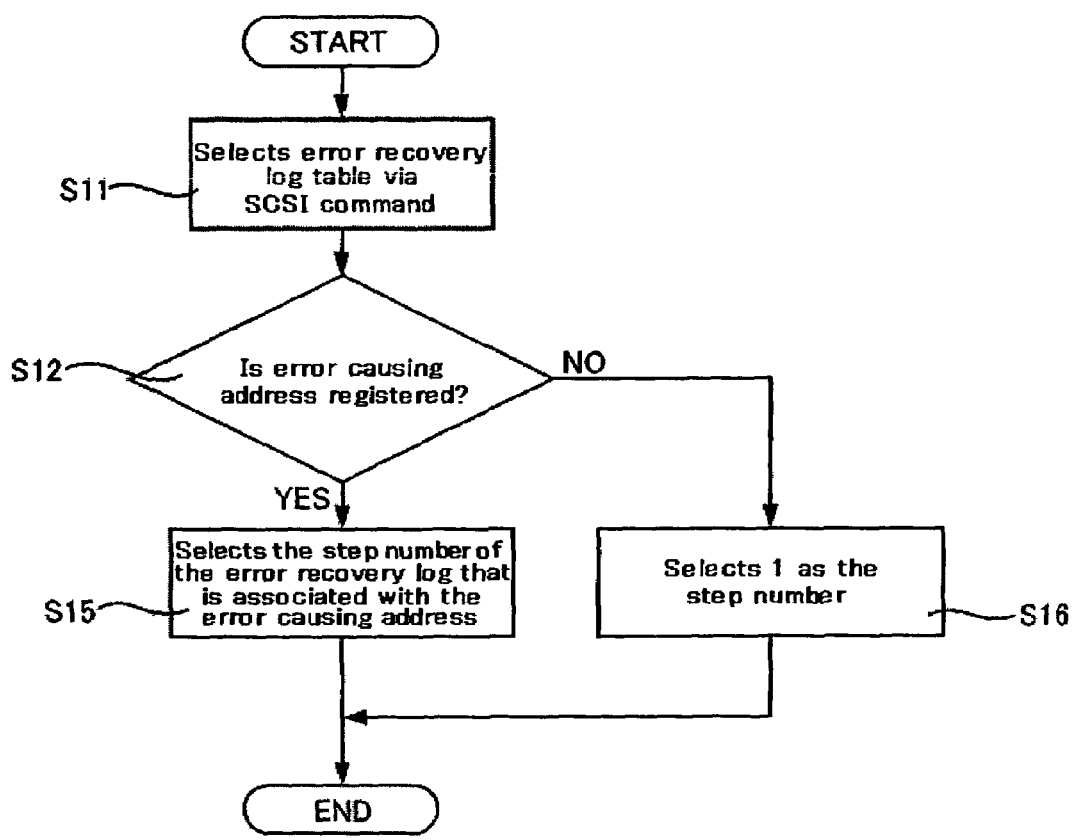
FIG. 9 is a flowchart of the process for selecting the step number of an error recovery procedure that indicates an error recovery action to be first conducted if a data read/write error occurs in the data storage system of the first embodiment.

A process for selecting the step number of the error recovery procedure that indicates an error recovery action to be first conducted if a data read/write error occurs is described below. FIG. 9 is a flowchart of the selection process.

In step S11, error recovery log table 15 is selected with the SCSI command as its reference. Whether the error recovery log 151 associated with the address at which the error occurred is registered in the error recovery log table 15 is judged in step S12.

If the error recovery log 151 associated with the address at which the error occurred is registered in the error recovery log table 15, a step number is selected from the step numbers 154 of that error recovery log 151 in step S15. If the error recovery log 151 associated with the address at which the error occurred is not registered in the error recovery log table 15, a step number of 1 is selected in step S16.

In the data storage device 10 according to the present embodiment, head numbers are used as addresses at which errors occurred, and since each head has its specific characteristics, an error recovery action can be efficiently executed if a data read/write error occurs.

Also, even if data read/write characteristics change between the head 111 and the disk 112 according to the particular operating environmental conditions, such as time or temperature, and an error recovery step effective for the data read or write error consequently changes, the error recovery process can be conducted efficiently since the step number 154 of the error recovery procedure that is associated with the error recovery process for any error recently encountered is stored.

In addition, since, in the error recovery log table 15, one error recovery log 151 only is registered for one address, the error recovery log table 15 can be simplified and this allows rapid search and reduction in the memory capacity required for storing the error recovery log table 15.

Second Embodiment

In a data storage device according to the present embodiment, only a step number associated with the latest error that was successfully corrected by error recovery is stored as the error recovery log stored into an error recovery log table. Also, an error recovery action of a step associated with the above step number of an error recovery procedure is first executed if a data read/write error occurs. The same constituent elements of the data storage device, and the same aspects of principles of operation thereof, as those of the first embodiment, are omitted from the following description.

Figure 10:
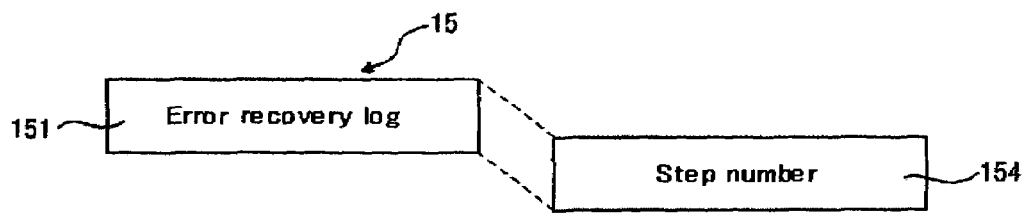
FIG. 10 shows the error recovery log table in a data storage device of a second embodiment.

In the present embodiment, only a step number is stored as the error recovery log 151 stored into error recovery log table 15. The error recovery log table 15 in the data storage device according to the present embodiment is shown in FIG. 10. Only step number 154 is stored as the error recovery log 151 stored into error recovery log table 15. One error recovery log 151 is stored within the error recovery log table 15.

The data storage device also has two independent error recovery log tables. One is a WRITE error recovery log table for use in case of a data write error, and one is a READ error recovery log table for use in case of a data read error. In addition, the step number 154 in the error recovery log 151 takes an initial value of 1.

When a data write error or a data read error is successfully corrected by error recovery, the step number of the error recovery procedure at that time is assigned to the step number 154. After this, error recovery is started from the error recovery action of the error recovery procedure that is associated with the step number which has been stored in the step number 154.

Each time the error recovery log table 15 is registered and updated, its contents are written into a system management area of a drive 11. Also, during a Power On Reset process, the contents of the error recovery log table 15 are read out from the system management area of the drive 11 and disposed in a RAM 126.

When a request for reading or writing data sequentially is executed, if a data write/read error occurs, it is most likely that a data read/write error will also occur near an address at which the error has occurred. Storing a step number of an error recovery action against the latest data read/write error, therefore, makes error recovery executable easily and efficiently for the data read/write error.

Third Embodiment

In a data storage device according to the present embodiment, a head number and cylinder number of an address at which a data read/write error has occurred are stored as an internal physical address of the error recovery log stored into an error recovery log table. This means that the order of execution of an error recovery step is determined using the same error recovery log for an access error to the sector identified by the same head number and cylinder number. The same constituent elements of the data storage device, and the same aspects of principles of operation thereof, as those of the first embodiment, are omitted from the following description.

The data storage device according to the present embodiment differs from that of the first embodiment in terms of internal physical address structure of the error recovery log 151. This is because the data storage device according to the present embodiment uses the same error recovery log 151 for the sector of the same head number and cylinder number region. The cylinder number region here refers to a region from the cylinder number obtained by adding a cylinder offset to a specific cylinder number, to the cylinder number obtained by subtracting the cylinder offset from that cylinder number.

Figure 11:
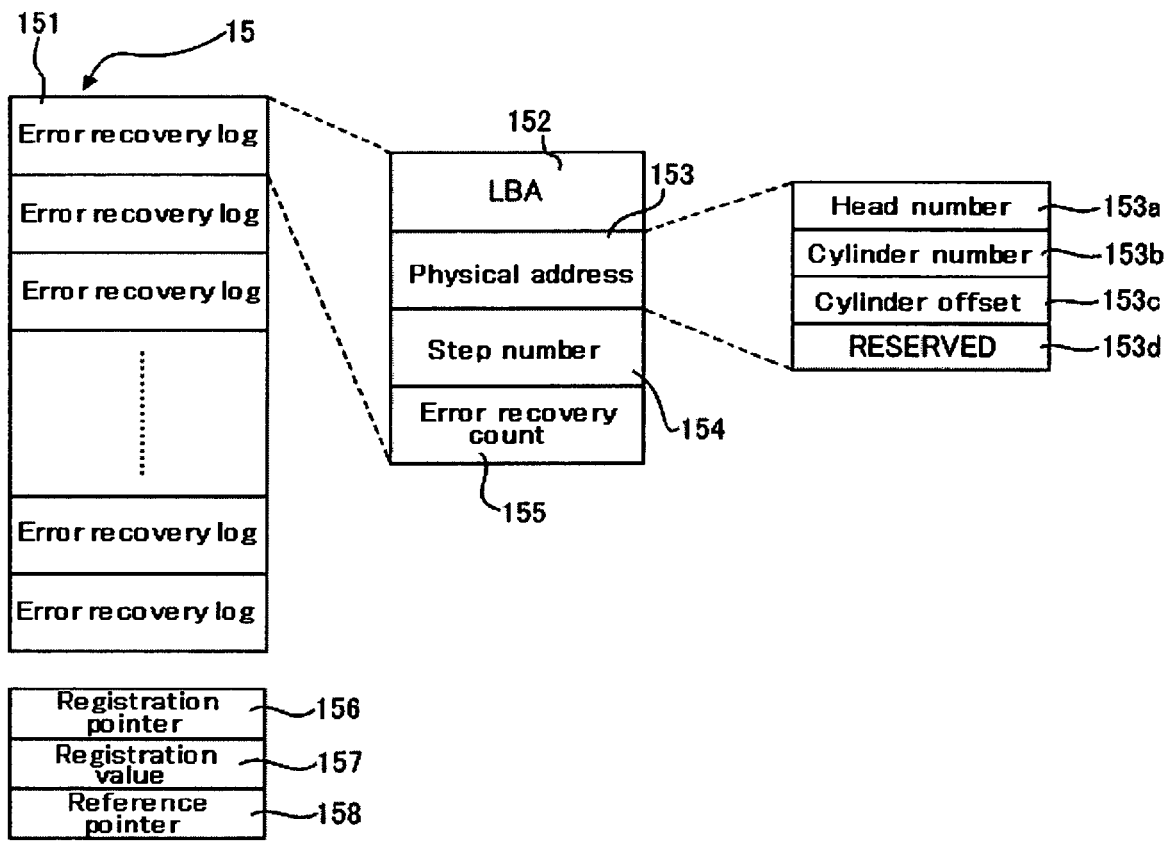
FIG. 11 is a construction diagram of an error recovery log table in a third embodiment.

A structure of an error recovery log table 15 according to the present embodiment is shown in FIG. 11. In the internal error recovery log 151 of the error recovery log table 15, a physical address 153 includes a head number 153a, a cylinder number 153b, a cylinder offset 153c, and a RESERVED region 153d. The cylinder offset 153c uses an initial value of 5, for example.

In the data storage device according to the present embodiment, when a data write error or a data read error is successfully corrected by error recovery, the head number 153a at the address where the error has occurred, the cylinder number 153b, and the cylinder offset 153c are stored into the physical address 153. Also, the head number 153a, the cylinder number 153b, and the cylinder offset 153c, together with an LBA 152, the step number 154 where the error recovery was successfully conducted, and an error recovery count 155, are registered as the error recovery log 151 in the error recovery log table 15.

If a data read/write error occurs, a check is first conducted to scan for matching to the head number of the address at which the error has occurred. Next, reference is made to the error recovery log 151 having the value obtained by adding or subtracting the cylinder offset 153c to or from the cylinder number of that address. After that, an error recovery action associated with the step number of an error recovery procedure that has been stored in the step number 154 of the error recovery log 151 is executed first.

Figure 12:
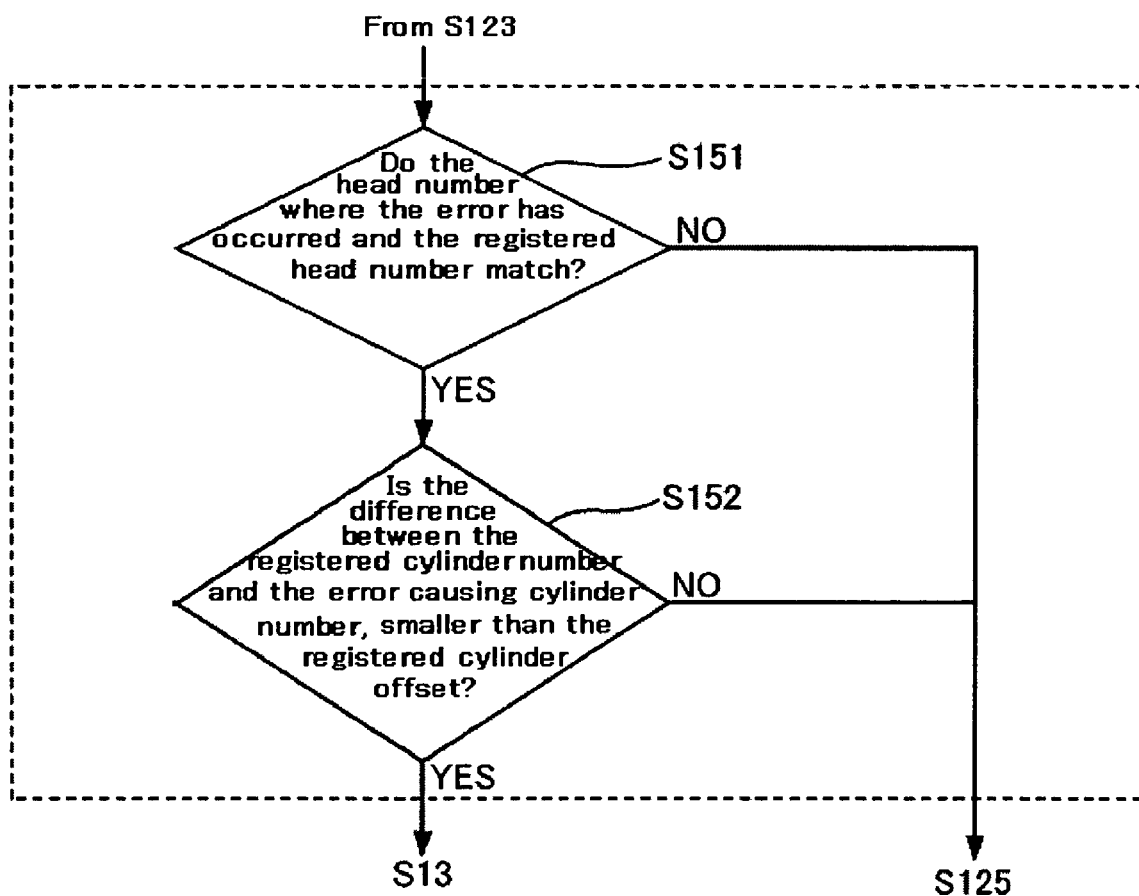
FIG. 12 is a flowchart of the process for comparing an address at which a data read/write error has occurred, and a physical address within the error recovery log stored in the error recovery log table, in the data storage device of the third embodiment.

Also, the comparison conducted, in step S124 of FIG. 6 in the data storage device of the first embodiment, between the address at which the data read/write error occurred and the physical address 153 within the error recovery log 151 stored within the error recovery log table 15, differs from the comparison conducted in the data storage device of the present embodiment. A flowchart of the comparison in the present embodiment is shown in FIG. 12.

In the data storage device of the present embodiment, the data error recovery action first conducted is determined from log information of head number 153a and cylinder number 153b. More specifically, whether the head number, where the data read/write error occurred, and the stored head number 153a in internal physical address 153 of the error recovery log 151 indicated by reference pointer 158 match is judged in step S151.

If the head number where the data read/write error occurred and the stored head number 153a in internal physical address 153 of the error recovery log 151 indicated by reference pointer 158 do not match, the error recovery log 151 indicated by reference pointer 158 is judged not to be the error recovery log 151 associated with the above error, and control proceeds to the step of S125 in FIG. 6.

If both head numbers match, cylinder numbers are compared in step S152.

If the cylinder number where the error occurred is within the value obtained by adding or subtracting the cylinder offset 153c to or from the cylinder number 153b stored in the internal address 153 of the error recovery log 151 that the reference pointer indicates, the particular error recovery log 151 is judged to be the error recovery log 151 associated with the above error.

If the cylinder number where the error occurred is not within the value obtained by adding or subtracting the cylinder offset 153c to or from the cylinder number 153b stored in the internal address 153 of the error recovery log 151 that the reference pointer indicates, the error recovery log 151 that the reference pointer 158 indicates is judged not to be the error recovery log 151 associated with the above error, and control proceeds to the step of S125 in FIG. 6.

Figure 13:
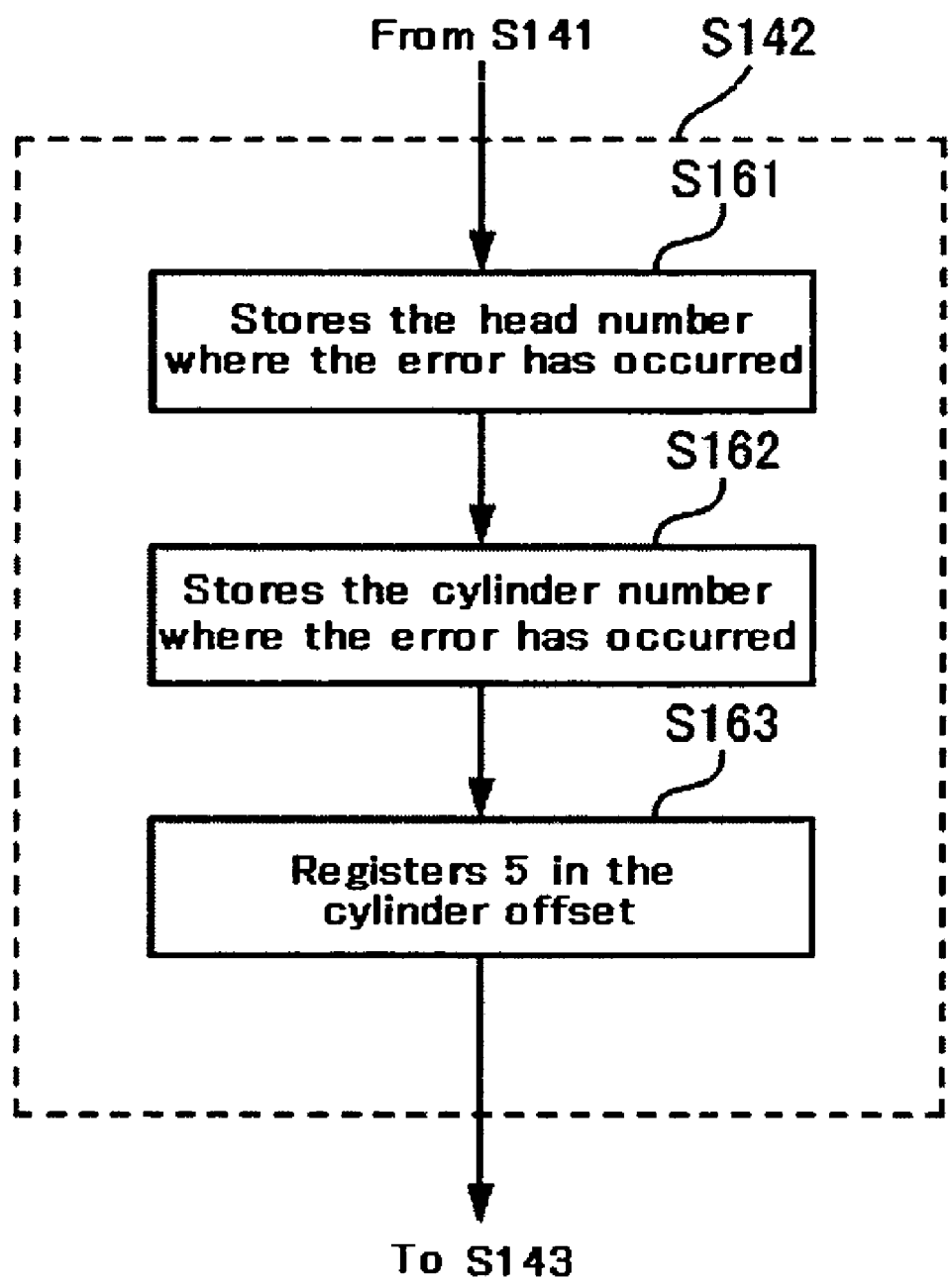
FIG. 13 is a flowchart that shows a process in which the physical address at which an error has occurred is newly registered in the data storage device of the third embodiment.

A flowchart that shows a process in which the physical address 153 at which an error has occurred is newly registered in the data storage device of the present embodiment is shown in FIG. 13. This process is essentially the same as step S142 of FIG. 8.

First, in the error recovery log 151 that the registration pointer 156 indicates, the head number of the address at which the error has occurred is stored in the head number 153a in the physical address 153 (step S161), the cylinder number of the address at which the error has occurred is stored in the cylinder number 153b (step S162), and 5 is stored in the cylinder offset 153c (step S163).

In the data storage device of the present embodiment, the data error recovery action first conducted is determined from the log information in the head number and cylinder number region if a data read/write error occurs. Thus, steps of the same error recovery procedure are most likely to be effective even for a data read/write error that may occur at an adjacent cylinder of the same head, and error recovery can be executed efficiently by attempting such an error recovery step first. Also, data read/write errors may be caused by a deviation of the head, and this event usually occurs for each cylinder, so error recovery can be executed efficiently by using independent error recovery logs for each cylinder number.

In the data storage device described above, while 5 has been stored and used as a fixed value of the cylinder offset, this cylinder offset may be updated to and stored as its optimal value. Also, in the above data storage device, while a head number, a cylinder number, and a cylinder offset have been used as the physical address 153, a head number, a cylinder number, a sector number, and a cylinder offset may be used as the physical address.

Fourth Embodiment

In a data storage device of the present embodiment, a zone number of an address at which a data read/write error has occurred is stored as an internal physical address of the error recovery log stored into an error recovery log table. That is to say, the order of execution of error recovery steps is determined using the same error recovery log for an access error to the sector identified by the same zone number. The same constituent elements of the data storage device, and the same aspects of principles of operation thereof, as those of the first embodiment, are omitted from the following description.

Figure 14:
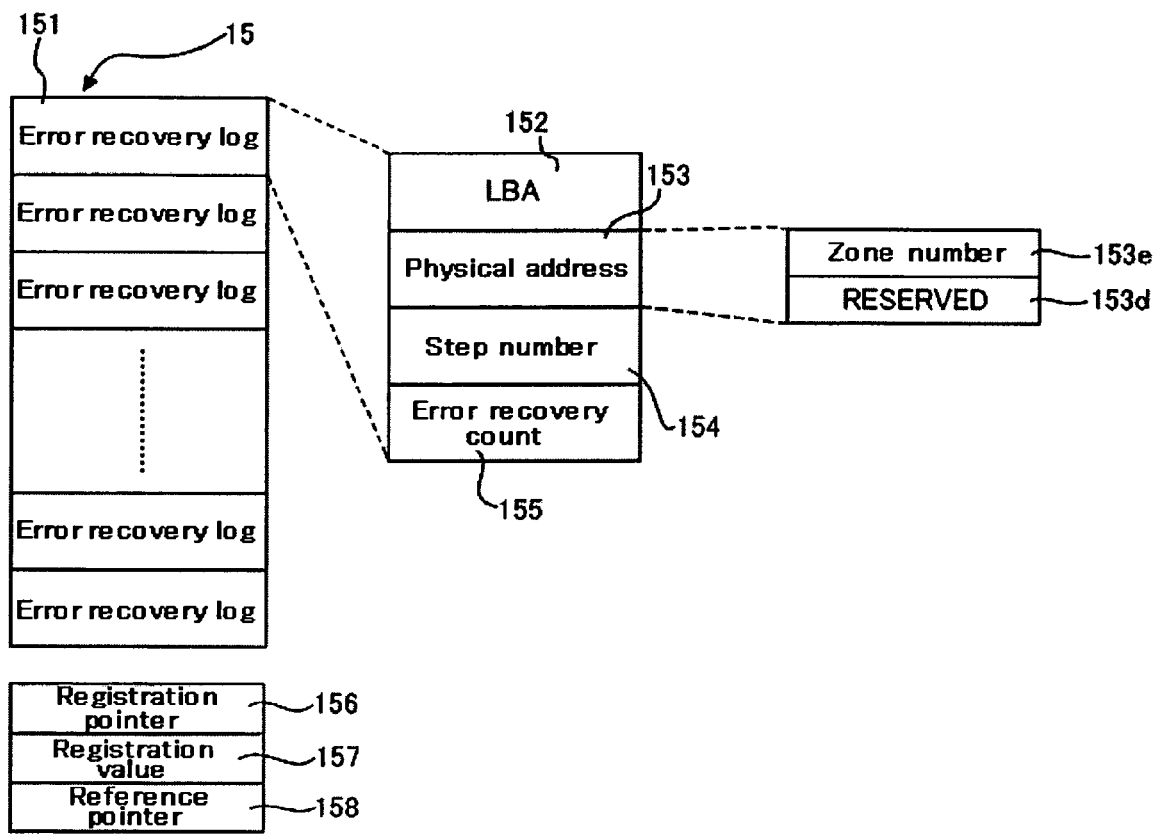
FIG. 14 is a construction diagram of an error recovery log table in a fourth embodiment.

The data storage device according to the present embodiment differs from that of the first embodiment in terms of internal physical address structure of an error recovery log 151. A structure of an error recovery log table 15 according to the present embodiment is shown in FIG. 14. Physical address 153 in the error recovery log 151 of the error recovery log table 15 according to the present embodiment is constructed of a zone number 153e and a RESERVED region 153d. The zone number 153e applies to a storage region for the zone number of the address at which a data read/write error has occurred.

In the data storage device of the first embodiment, the address at which a data read/write error has occurred and the physical address 153 of the error recovery log 151 that the reference pointer 158 indicates are compared in step S124. In this step, a head number is used as the address. In the present embodiment, however, a zone number is used as the address.

Since the signal frequency of the read signal 31 or write signal 32 changes at inner diametral and outer diametral edges of the magnetic disk, the kind of error occurring during data reading/writing is likely to change. In the present embodiment, therefore, response to errors caused by the above factor becomes possible by using an error recovery log for each zone.

Fifth Embodiment

In a data storage device of the present embodiment, a plurality of error recovery logs 151 having the same physical address 153 are registrable in an error recovery log table 15.

If a data read/write error occurs, when a plurality of error recovery logs 151 having the same physical address 153 as an address at which the error has occurred are registered in the error recovery log table 15, reference is made to a step number 154 of the error recovery log 151 having the largest error recovery count 155 among the plurality of error recovery logs 151. The same constituent elements of the data storage device, and the same aspects of principles of operation thereof, as those of the first embodiment, are omitted from the following description.

The data storage device according to the present embodiment differs from that of the first embodiment in terms of a manner of judging in step S12 of FIG. 5 whether an address at which error recovery was conducted is registered. In the data storage device of the present embodiment, since a plurality of error recovery logs 151 associated with one address are likely to have been registered, the judgment in step S12 means judging whether both the address at which the error recovery was conducted and the step number of an error recovery procedure where the error recovery was conducted match respective equivalents.

Figure 15:
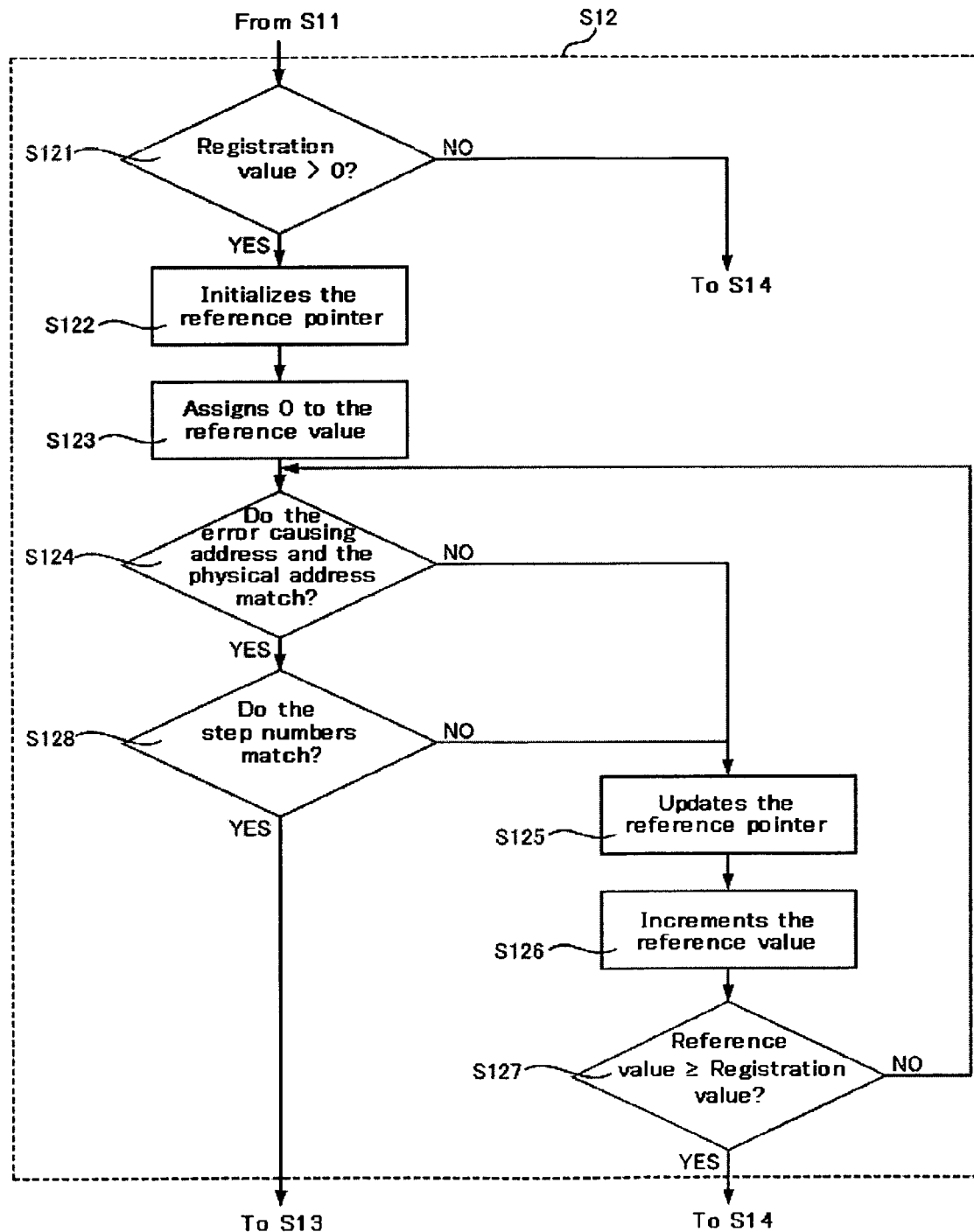
FIG. 15 is a flowchart of judging whether an address at which an error recovery has been conducted in a data storage device of a fifth embodiment.

FIG. 15 shows a process of judging in step S12 of FIG. 5 whether the address at which the error recovery was conducted is registered. Description of process steps S121 to S123 is omitted since these steps are the same as for the data storage device according to the first embodiment.

After execution of step S123, a comparison is made between the address at which the data read/write error occurred, and the address that was stored in the physical address 153. If both addresses do not match, process steps S125 and S126 are conducted and then if, in step S127, an associated reference count is judged to be equal to or greater than the value registered in registration count 157, control proceeds to step S14 of FIG. 5. If the reference count is smaller than the registration count 157, control is returned to immediate front of step S124.

If the address at which the data read/write error occurred and the address that was stored in the physical address 153 match, a comparison is conducted between the step number of the error recovery procedure where the error recovery was conducted at the address where the error occurred, and the step number stored in the step number 154 within the error recovery log 151 being referred to.

If the above two step numbers match, control proceeds to step S13 of FIG. 5. If the step numbers do not match, process steps S125 to S127 are conducted similarly to a mismatch between the address stored in the above physical address and the address at which the error occurred.

Figure 16:
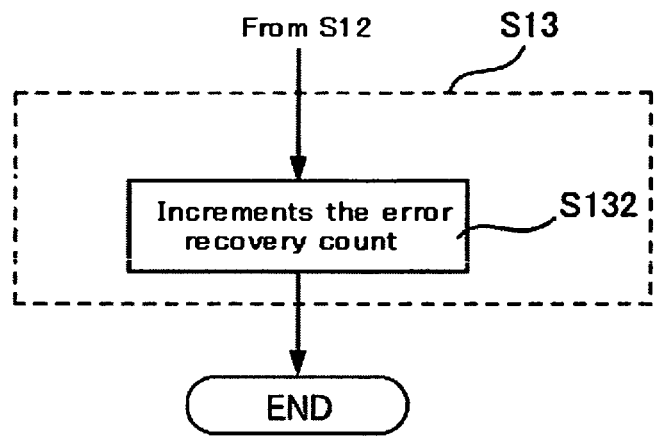
FIG. 16 is a flowchart of updating an error recovery log of the address at which the error recovery has been conducted in the data storage device of the fifth embodiment.

Also, in the data storage device of the present embodiment, only process step S132 in FIG. 7 is conducted (see FIG. 16) as an equivalent of the step S13 shown in the flowchart of FIG. 5.

In addition, a method of selecting the step number of the error recovery procedure that indicates an error recovery action to be first conducted differs between the data storage device of the present embodiment and the data storage device of the first embodiment.

In the error recovery logs 151 registered with different step numbers and for the same address, the error recovery action of the step number registered in the step number 154 within the error recovery log 151 having the value registered in the largest error recovery count 155 is executed first in the data storage device of the present embodiment.

Figure 17:
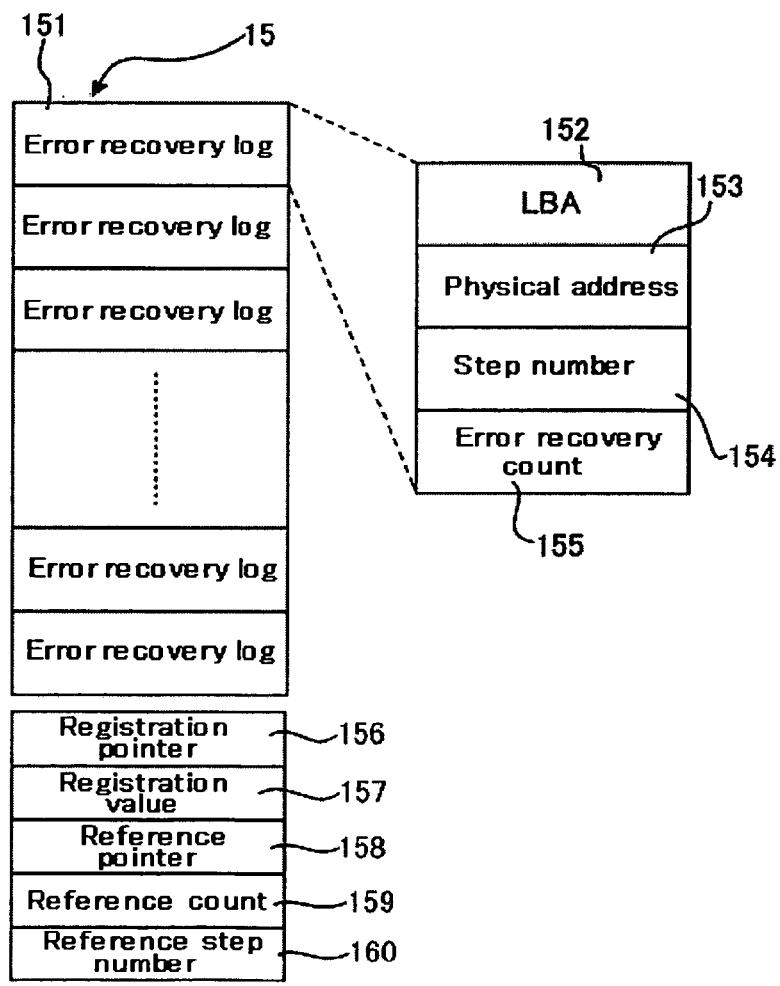
FIG. 17 is a construction diagram of the error recovery log table in the fifth embodiment.

For this reason, a variable for comparing error recovery counts 155, a reference count 159, and a reference step number 160 are arranged in the RAM 126 (see FIG. 17). The reference count 159 holds the largest of the error recovery counts 155 stored within the error recovery log 151 having the physical address 153 in which is stored the value matching the address at which the error occurred. Also, the reference step number 160 holds the number stored in the step number 154 of the error recovery log 151 in which the value within the reference count 159 is stored in the error recovery count 155.

Figure 18:
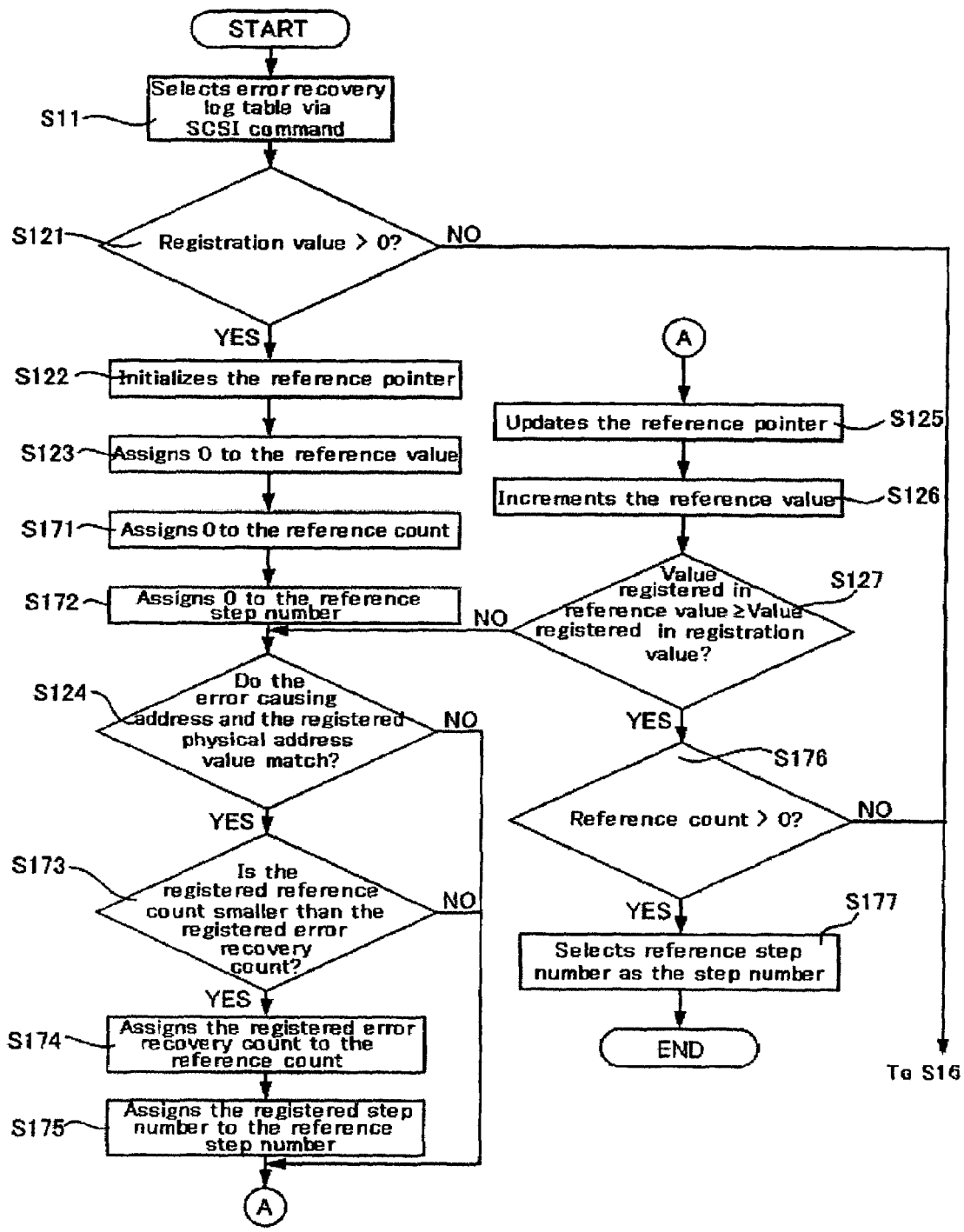
FIG. 18 is a flowchart of selecting the step number of an error recovery procedure that is associated with the error recovery action first executed in a data storage device of the fifth embodiment.

A flowchart of using the above reference count 159 and reference step number 160 to select the step number of the error recovery procedure that is associated with the error recovery action first executed is shown in FIG. 18.

First in step S11, either the error recovery log table 15 for read error recovery or the error recovery log table 15 for write error recovery is selected using an SCSI command. Whether the value that has been registered in the registration count is greater than 0 is judged in step S121. If the registered value is smaller than 0, control proceeds to step S16 of FIG. 9.

If the value that has been registered in the registration count is greater than 0, an error recovery log 151 is judged to have been registered in the error recovery log table 15. After this, the reference pointer 158 is initialized in step S122 and then in step S123, 0 is assigned to the value to which reference has been made. In addition, 0 is assigned to the reference count in step S171 and then 0 is assigned to the reference step number in step S172.

In step S124, it is judged whether the error recovery log 151 for the address at which the error occurred is registered in the error recovery log table 15. If the error recovery log 151 for the address at which the error occurred is not registered in the error recovery log table 15, the reference pointer is updated in step S125 and then the value to which reference has been made is incremented in step S126.

After that, the value that has been registered in the value to which reference has been made and the value that has been registered in the registration count 157 are compared in step S127. If the value that has been registered in the value to which reference has been made is smaller than the value that has been registered in the registration count 157, not all contents of the error recovery log table 15 are judged to have been referred to, and control proceeds to the immediate front of step S124.

If the value that has been registered in the value to which reference has been made is greater than the value that has been registered in the registration count 157, it is judged that reference has been made to all contents of the error recovery log table 15. This judgment is followed by step S176 of judging whether the reference count 159 is greater than 0. If the reference count 159 is smaller than 0, control proceeds to step S16 of FIG. 9. If the reference count 159 is greater than 0, the reference step number is selected as the step number, in step S177.

If the error recovery log 151 for the address at which the error occurred is registered in the error recovery log table 15, it is judged in step S173 whether the value registered in the reference count 159 is smaller than the value registered in the error recovery count 155.

If it is judged that the value registered in the reference count 159 is greater than the value registered in the error recovery count 155, the judgment is followed by an operation similar to that conducted if the error recovery log 151 for the address at which the error occurred is not registered in the error recovery log table 15.

If the value registered in the reference count 159 is greater than the value registered in the error recovery count 155, the value registered in the error recovery count 155 of the error recovery log 151 being referred to is assigned to the reference count 159 (step S174) and the step number 154 in the error recovery log 151 being referred to is assigned to the reference step number 160 (step S175).

The above is followed by an operation similar to that conducted if the error recovery log 151 for the address at which the error occurred is not registered in the above error recovery log table 15.

In the data storage device according to the present embodiment, if data read/write characteristics change between the head 111 and the disk 112 according to the particular operating environmental conditions, such as time or temperature, and an error recovery step effective for the data read or write error consequently changes, error recovery can be conducted efficiently by executing the step of the largest error recovery count first.

In the data storage device according to the present embodiment, the physical address 153 used may be a head number as in the first embodiment, or may include a head number, a cylinder number, and a cylinder offset, as in the third embodiment. Otherwise, a zone number may be used, as in the fourth embodiment.

Sixth Embodiment

In the data storage device according to the present embodiment, different control methods are used between accessing a plurality of continuous sectors and accessing a plurality of discontinuous sectors or a single independent sector. One specific example is by judging whether addresses to be accessed are sequential (i.e., whether a plurality of continuous sectors are to be accessed) and if the addresses are sequential, a step number of an error recovery step to be first executed is determined using the scheme according to the second embodiment. If the addresses are not sequential, a step number of the error recovery step to be first executed is determined using the scheme according to the first embodiment. The same constituent elements of the data storage device, and the same aspects of principles of operation thereof, as those of the first, second, third, fourth, or fifth embodiment, are omitted from the following description.

Figure 19:
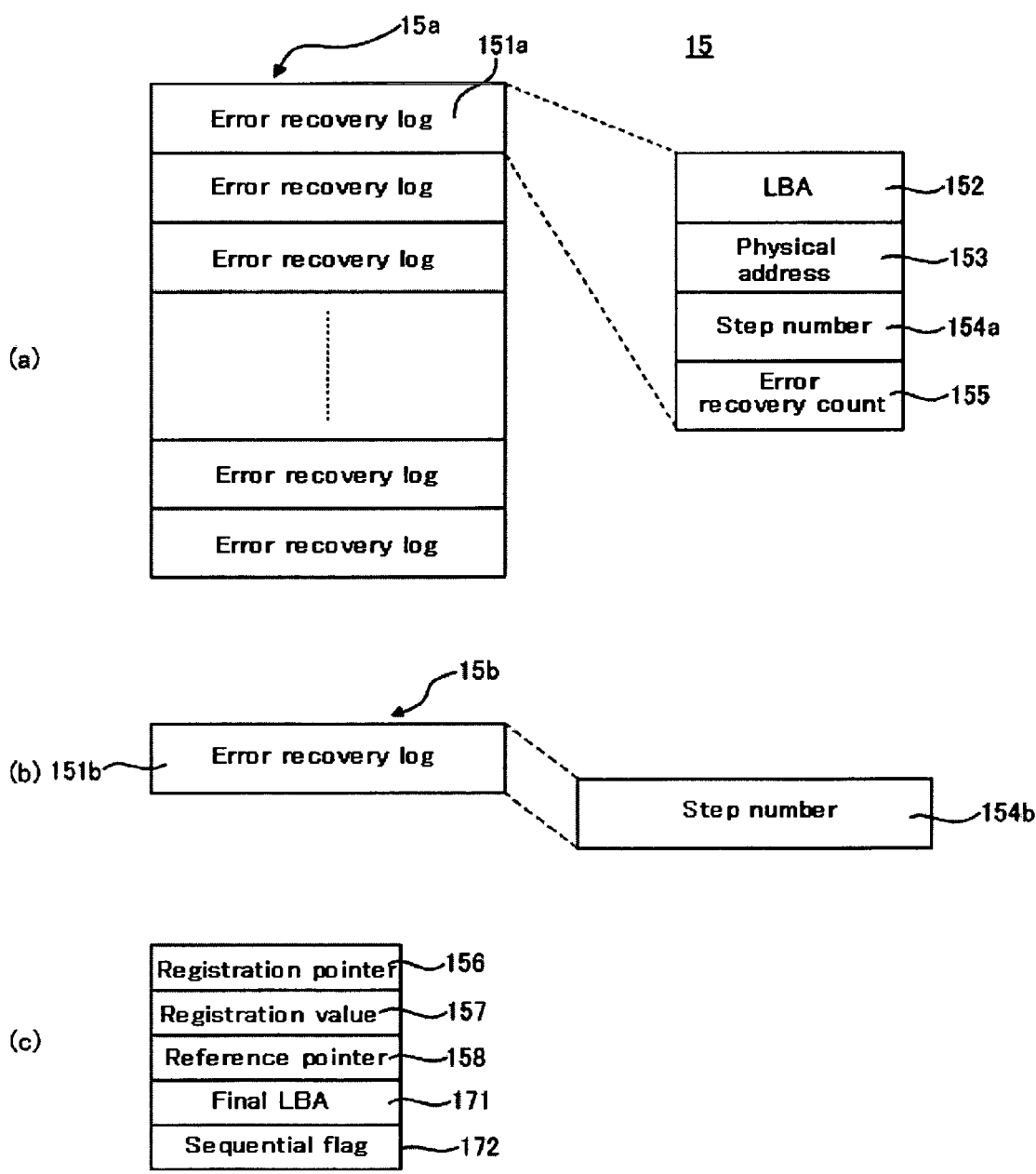
FIGS. 19(a), 19(b) and 19(c) are construction diagrams of an error recovery log table in a data storage device of a sixth embodiment.

In the data storage device according to the present embodiment, both an error recovery log table 15a according to the first embodiment and an error recovery log table 15b according to the second embodiment are provided as error recovery log tables 15 in a RAM 126. One error recovery log table 15 that was stored into the RAM 126 of the data storage device according to the present embodiment is shown in FIGS. 19(a) to 19(c).

Whether the addresses to be accessed are sequential is judged by comparing the LBA last accessed using the previous READ or WRITE command, and the LBA specified in the CDB (Command Descriptor Block) of a current READ or WRITE command whose execution is to be started. Whether the addresses to be accessed are sequential is judged during a start of READ or WRITE command execution, and judgment results are stored into the RAM 126.

After the occurrence of the data read/write error, results of the above judgment are referred to and if the addresses to be accessed are sequential, the step number of the error recovery step to be first executed is determined from the error recovery log table 15b. If the addresses to be accessed are not sequential, the step number of the error recovery step to be first executed is determined from the error recovery log table 15a.

In the data storage device according to the present embodiment, when error recovery is conducted, both the error recovery log table 15a and the error recovery log table 15b are registered and updated, regardless of whether the addresses to be accessed are sequential.

In order to further judge whether the READ or WRITE command is sequential, two final LBAs 171 are disposed in the RAM 126. One LBA 171 is for READ commands, and the other is for WRITE commands. When the microprocessor 124 executes the READ or WRITE command, the LBA last accessed is stored and retained in the internal final LBA 171 of the RAM 126.

A sequential flag 172 that indicates whether the READ or WRITE command is sequential is also disposed in the RAM 126. When the sequential flag 172 has a value of 0×FF, this indicates that the addresses to be accessed are sequential, and when the sequential flag 172 has a value of 0, this indicates that the addresses to be accessed are not sequential. When it executes READ or WRITE commands, the microprocessor 124 judges whether the command is sequential, and records and retains judgment results in the sequential flag 172.

Figure 20:
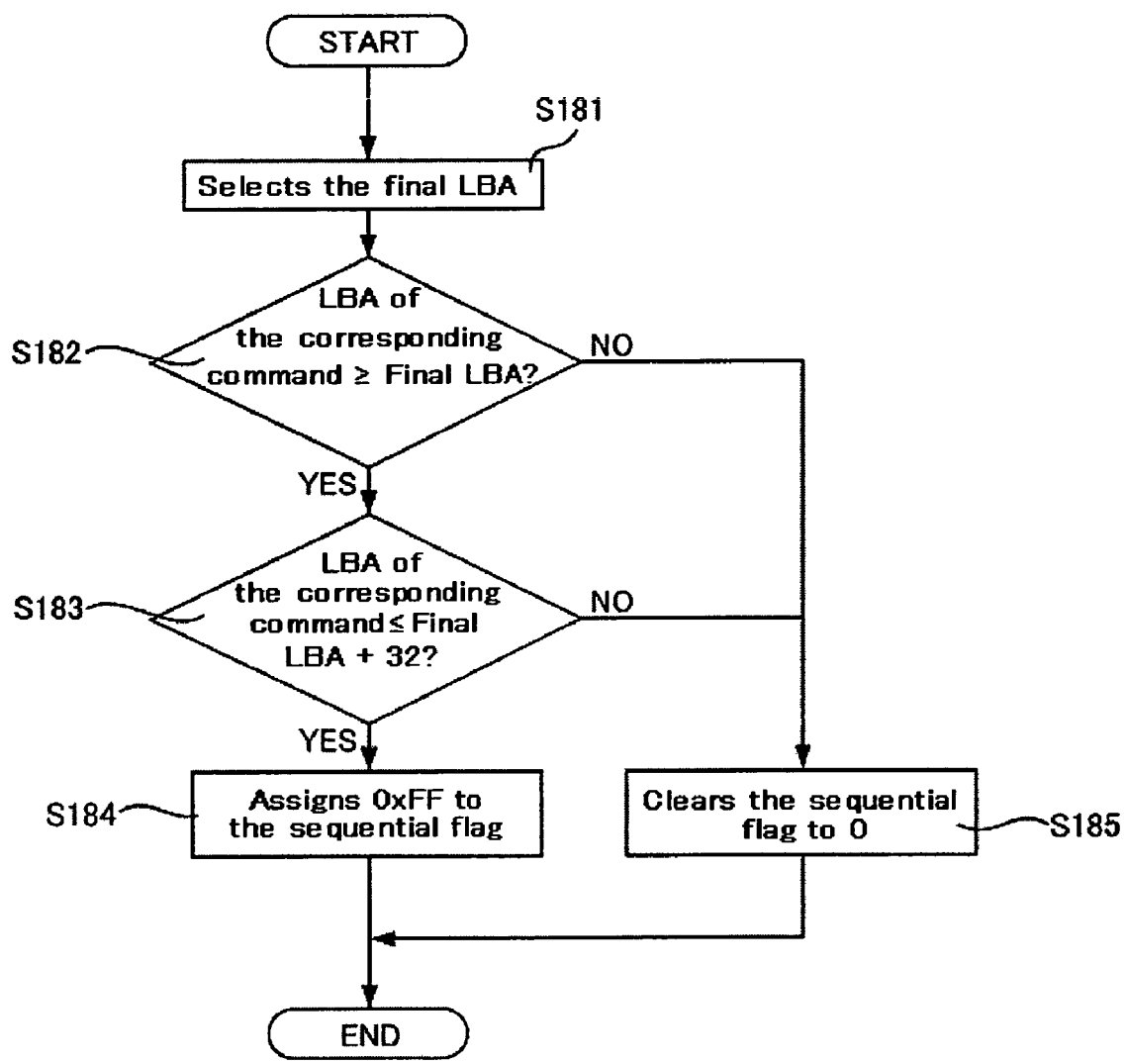
FIG. 20 is a flowchart of judging whether the READ or WRITE command is sequential.

FIG. 20 is a flowchart of judging whether the READ or WRITE command is sequential. Whether the READ or WRITE command is sequential is judged by comparing the LBA of the command executed and the LBA stored in the final LBA 171.

First, in step S181, the final LBA 171 is selected with the READ or WRITE command as a reference. In step S182, a comparison is made between the LBA of the command and the LBA stored in the final LBA 171. If the LBA of the command is smaller than the LBA stored in the final LBA 171, the address to be accessed is judged not to be sequential, and the microprocessor 124 clears the sequential flag 172 to 0 in step S183.

If the LBA of the command is equal to or greater than the LBA stored in the final LBA 171 and is greater than the value obtained by adding 32 to the LBA stored in the final LBA 171, the address to be accessed is judged not to be sequential, and the microprocessor 124 clears the sequential flag 172 to 0.

If the LBA of the command is equal to or smaller than a value obtained by adding 32 to the LBA stored in the final LBA 171, the address to be accessed is judged to be sequential, and the microprocessor 124 assigns 0×FF to sequential flag 172 in step S184.

Figure 21:
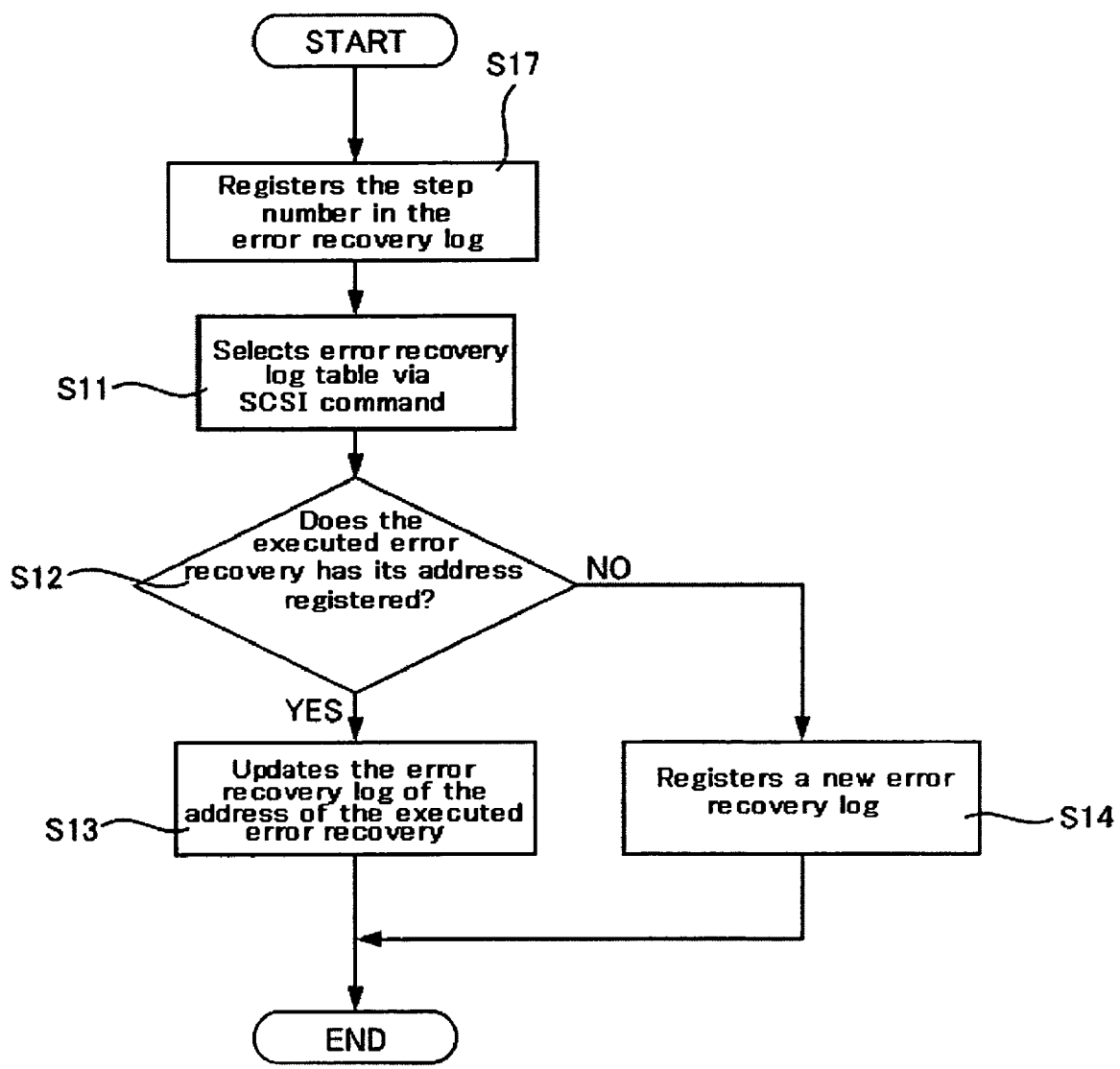
FIG. 21 is a flowchart showing a registering/updating process for an error recovery log in a data storage device of the sixth embodiment.

FIG. 21 is a flowchart showing a registering/updating process for an error recovery log 151a, 151b. In the registering/ updating process for the error recovery log 151a, 151b, when error recovery is conducted, a step number of the error recovery action which has been executed in order to recover the disk from the error is first registered in step S17. After this, the error recovery log registering/updating process steps (S11 to S14) in FIG. 5 of the first embodiment are executed to conduct the registering/updating process for the error recovery log 151a.

Figure 22:
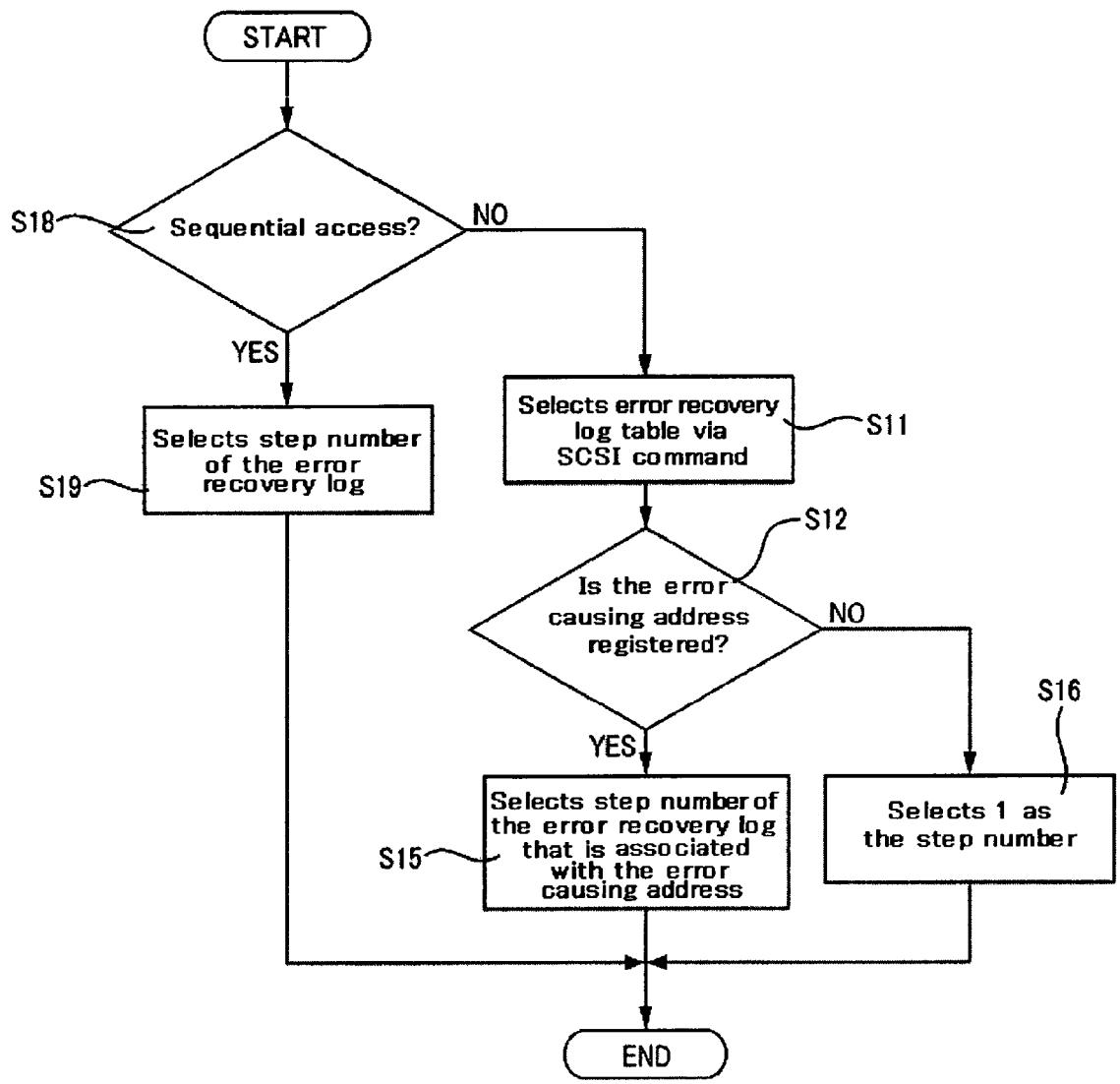
FIG. 22 is a flowchart of the process for selecting the step number of an error recovery procedure that is associated with the error recovery action first executed in the data storage device of the sixth embodiment.

FIG. 22 is a flowchart showing a process of selecting a step number of the error recovery procedural step to be first executed in the data storage device according to the present embodiment. If a data read error or a data write error occurs, the sequential flag 172 is referred to and whether the address to be accessed is sequential is judged in step S17. The step number registered in an internal step number 154b of the error recovery log 151b is selected if the address to be accessed is sequential.

If the address to be accessed is not sequential, the process steps (S11, S12, S15, S16) of selecting the step number of the error recovery procedural step to be first executed in FIG. 9 of the first embodiment are conducted to select the step number.

In the data storage device according to the present embodiment, a scheme of an error recovery to be conducted is determined from whether the address to be accessed is sequential. If the addresses to be accessed are sequential, the error recovery action last executed is most likely to be effective, so the error recovery can be conducted efficiently by storing a step number of the previous error recovery action.

At the same time, even if the addresses to be accessed are not sequential, the scheme also allows efficient error recovery since an appropriate error recovery action is determined for each address.

While the scheme of the first embodiment and that of the second embodiment are combined in the above sixth embodiment, the scheme of the second embodiment and that of either the third embodiment, the fourth embodiment, or the fifth embodiment may be combined instead. Also, either a head number, a combination of a head number, a cylinder number, and a cylinder offset, or a zone number can be selected as the address.

Seventh Embodiment

A data storage device according to the present embodiment employs a scheme of executing error recovery steps by sorting respective step numbers according to frequency of error recovery. The same constituent elements of the data storage device, and the same aspects of principles of operation thereof, as those of the first, second, third, fourth, fifth, or sixth embodiment, are omitted from the following description.

In the data storage device according to the present embodiment, a plurality of error recovery logs 151 each having the same physical address 153 can be registered in an error recovery log table 15. A head number is used as the physical address 153.

First, in the data storage device according to the present embodiment, a chain of error recovery logs is constructed for each head number. A log chain table 16 having the error recovery logs 151 arranged in order of a magnitude of the value registered in an error recovery count 155 for the same head number is stored within a RAM 126.

If a data read error or a data write error occurs, error recovery actions are conducted in order from the error recovery action registered at a beginning of the log chain table 16 associated with a head number of an address at which the error has occurred, toward the error recovery action registered at an end of the log chain table 16. If the error is not corrected by executing a step of the error recovery action registered at the end of the log chain table 16, the steps of other error recovery actions that have not been executed until that time are executed in numerical order of the steps.

When the error recovery is successful, the appropriate error recovery log 151 is registered and updated. At the same time, a value of this error recovery log is compared with the value registered in an error recovery count 155, and the log chain table 16 is correspondingly updated. When the error recovery log 151 is registered and updated, the log chain table 16 is written with the error recovery log table 15 into a management area of a disk drive.

In the data storage device according to the present embodiment, independent log chain tables 16 are constructed for each head number. For each head number, pointers that point numbers of the error recovery logs registered at a beginning and end of the chain are stored and retained in the RAM 126. Both the pointers pointing the beginning and end of the chain take an initial value of 0×FF.

Figure 23:
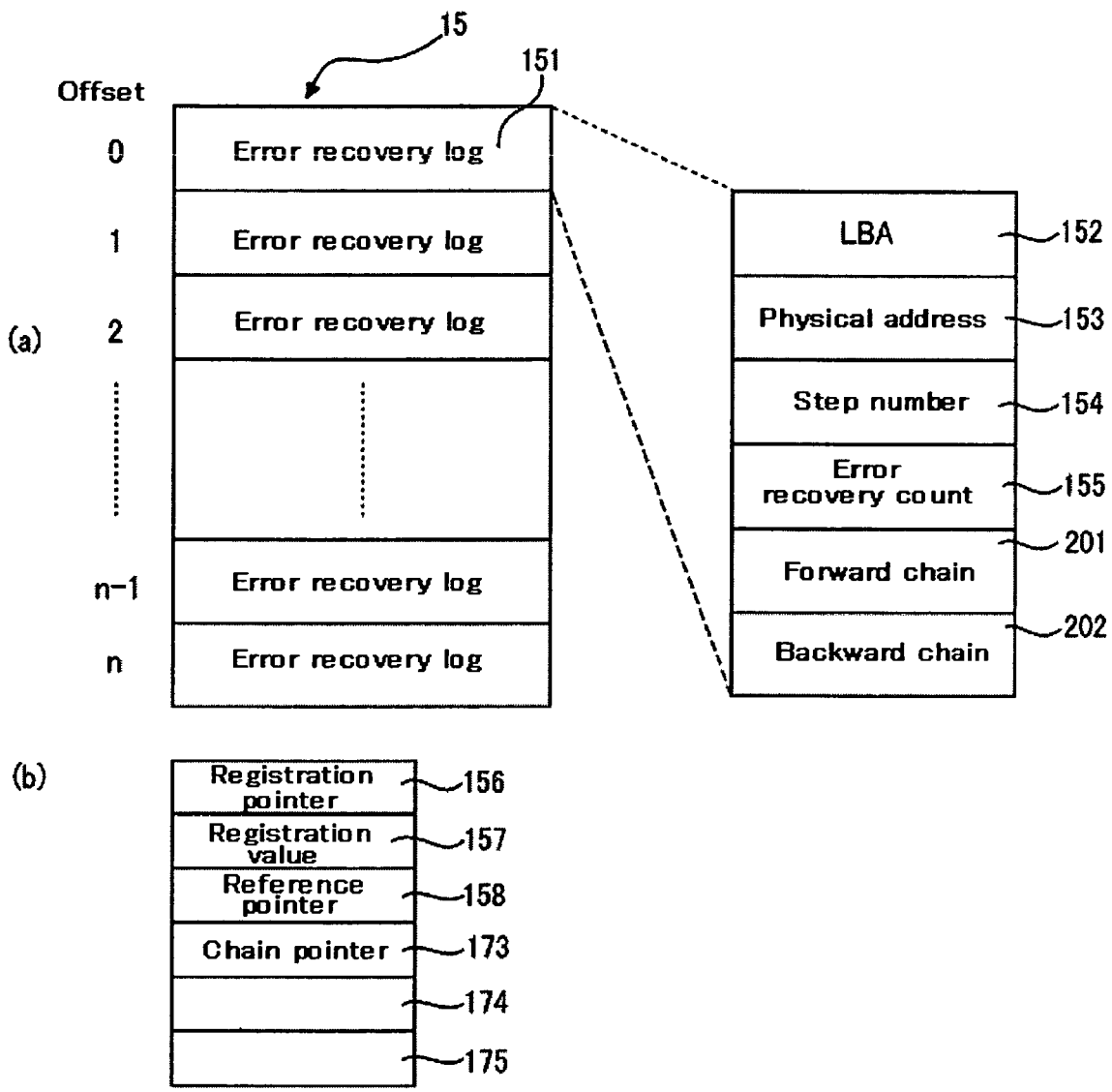
FIGS. 23(a) and 23(b) are construction diagrams of an error recovery log table in a data storage device of a seventh embodiment.

A configuration of the error recovery log table 15 is shown in FIGS. 23(a) and 23(b). This table differs from the error recovery log table 15 of the first embodiment in that a chain pointer 173 is added. Also, each error recovery log 151 has an associated offset number. In addition, a forward chain 201 and a backward chain 202 are added to each error recovery log 151.

The forward chain 201 functions similarly to a head number associated with the error recovery log 151 having the forward chain 201. That is to say, an offset number of the error recovery log 151 having an error recovery count 155 in which is registered the second largest value following the value registered in the error recovery count 155 of the error recovery log 151 of the forward chain 201, is registered in the forward chain 201. The forward chain 201 is used to refer to each error recovery log 151 in order of the magnitude of the value registered in the error recovery count 155 for the same head number.

The backward chain 202 functions similarly to a head number associated with the error recovery log 151 having the backward chain 202. That is to say, an offset number of the error recovery log 151 having an error recovery count 155 in which is registered the second smallest value following the value registered in the error recovery count 155 of the error recovery log 151 of the backward chain 202, is registered in the backward chain 202. The backward chain 202 is used to update the forward chain 201 and the backward chain 202 itself when each error recovery log 151 is registered and updated.

Figure 24:
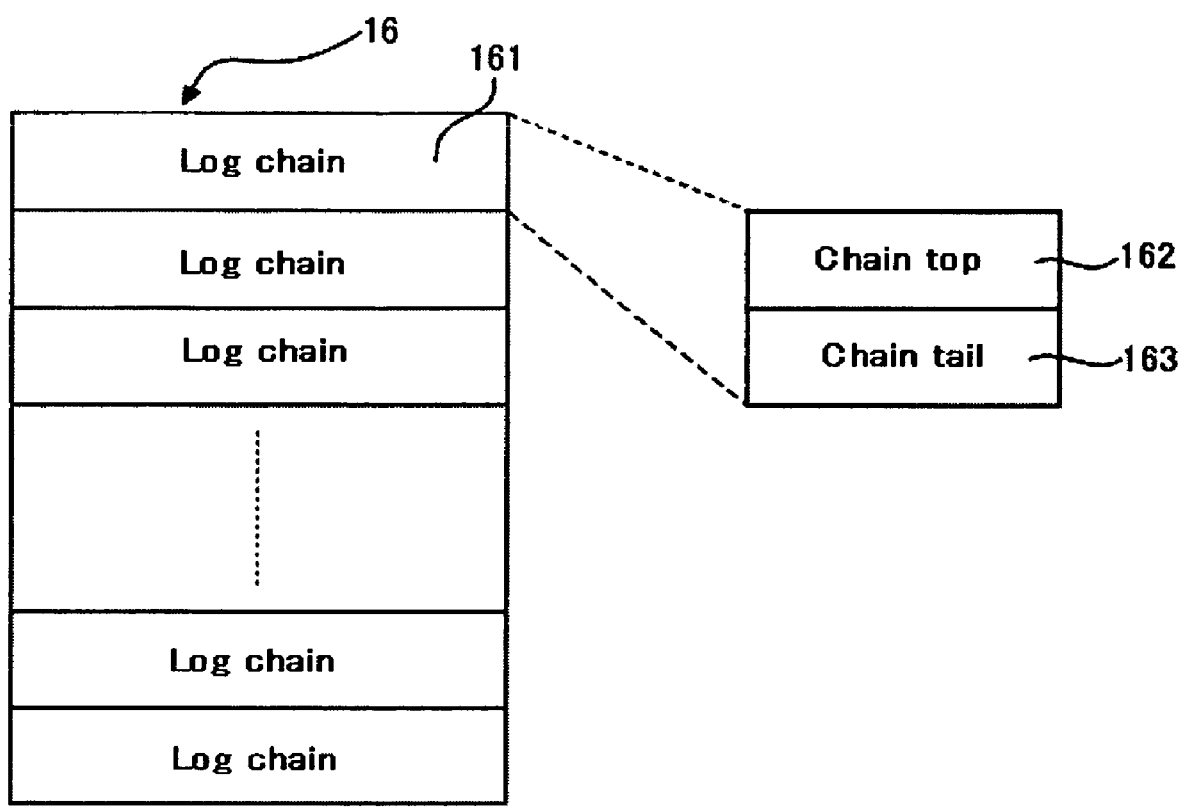
FIG. 24 is a configuration diagram of the log chain table.

A configuration of the log chain table 16 is shown in FIG. 24. The log chain table 16 is disposed in the RAM 126 in order to manage the error recovery chain under the same head number. The log chain table 16 has log chains 161 as many as there actually are magnetic heads. Each log chain 161 further has a chain top 162 and a chain tail 163.

The chain top 162 is a region for storing and retaining the offset number of the error recovery log 151 associated with the error recovery count 155 having the largest value registered under the same head number. The chain tail 163 is a region for storing and retaining the offset number of the error recovery log 151 associated with the error recovery count 155 having the smallest value registered under the same head number.

As with those of the error recovery log table 15, contents of the log chain table 16 are written into a system management area of drive 11 each time the log chain table 16 is registered/updated. During a Power On Reset process, the contents of the log chain table 16 are read out from the system management area of the drive 11 and disposed in the RAM 126.

Figure 25:
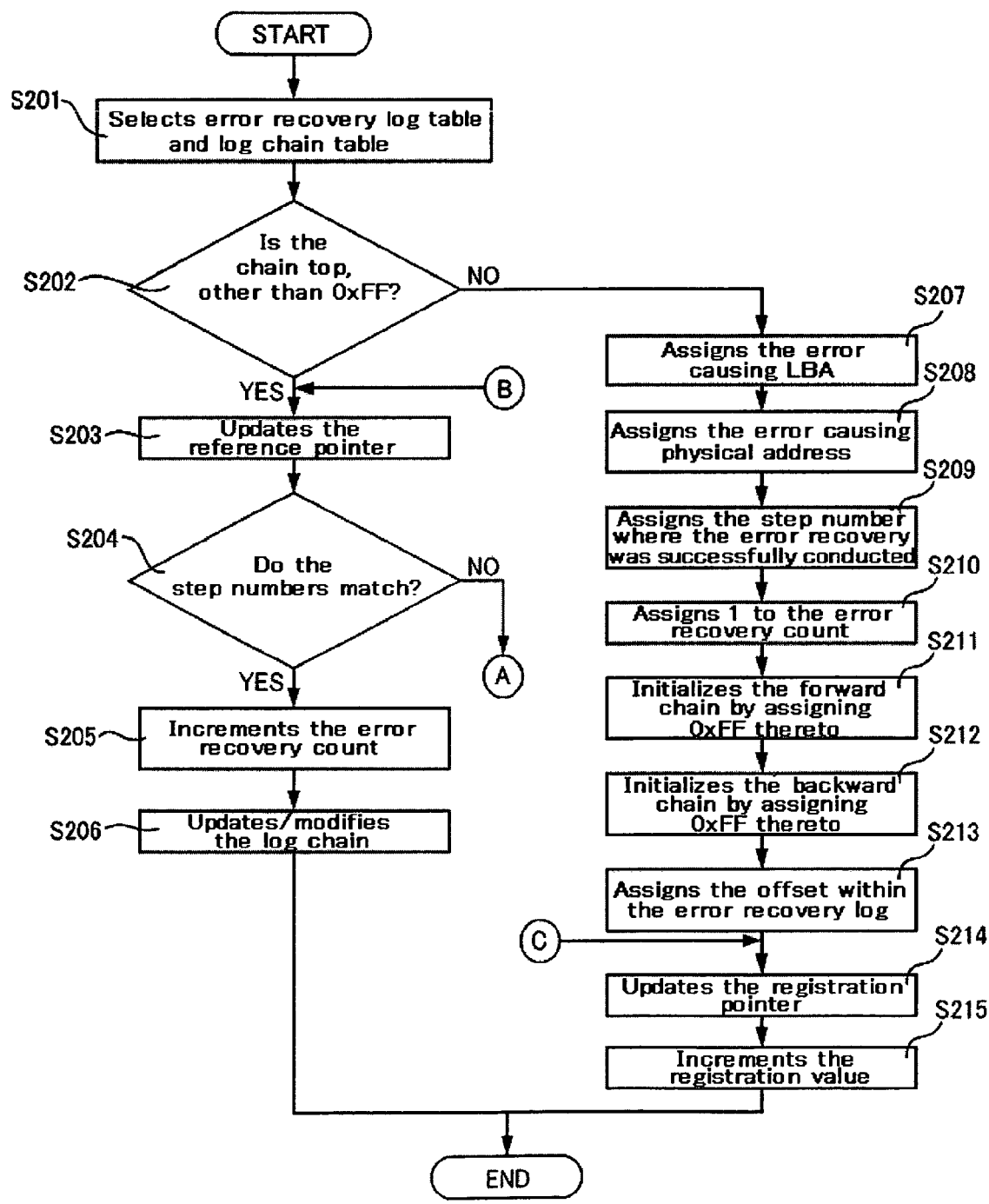
FIG. 25 is a flowchart of a process for error recovery log registration/updating and error recovery log chain construction in the data storage device of the seventh embodiment.
Figure 26:
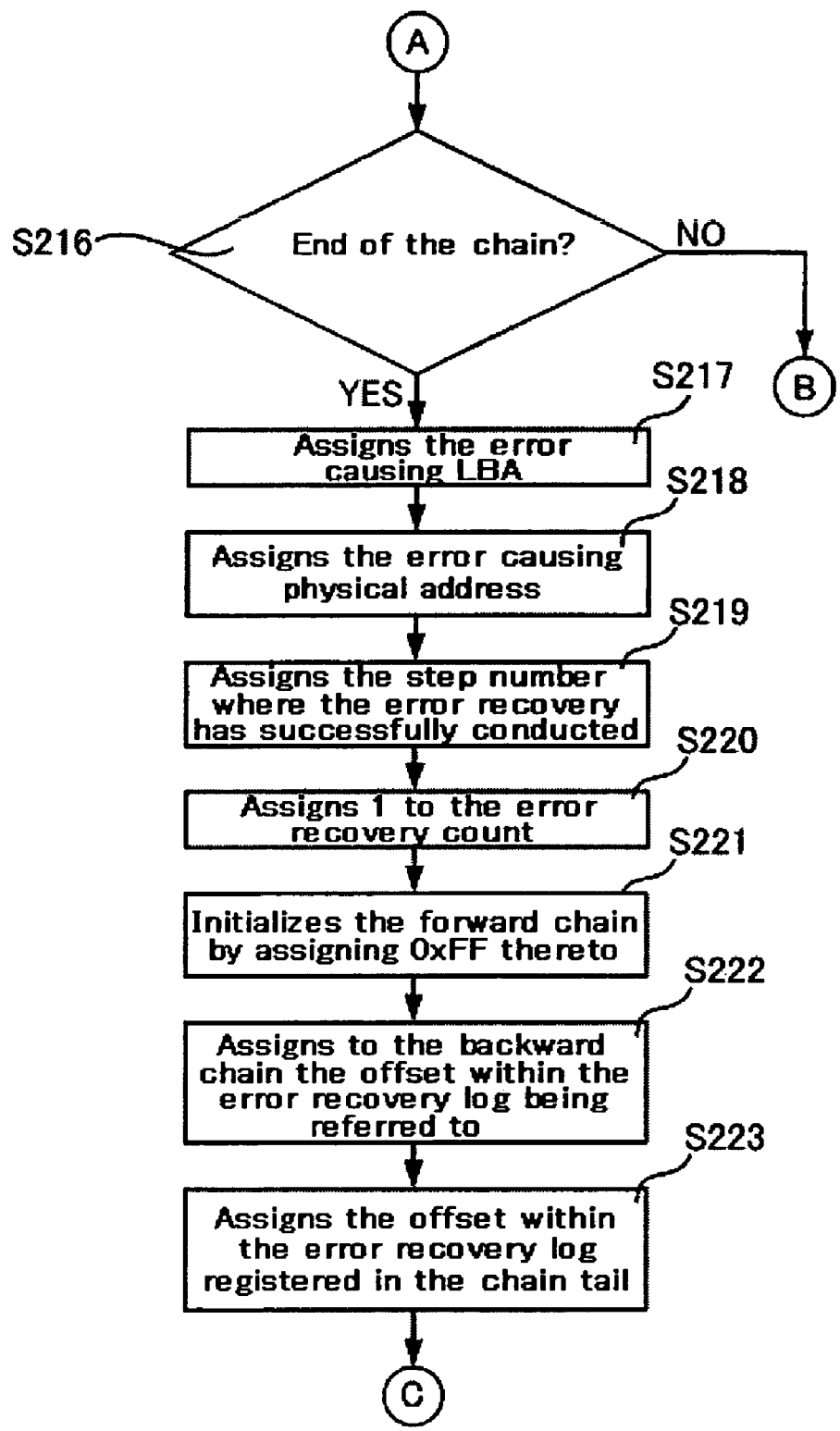
FIG. 26 is a flowchart of another process for error recovery log registration/updating and error recovery log chain construction in the data storage device of the seventh embodiment.

A registration/updating process for an error recovery log 151 and a chain constructing process for an error recovery log are shown in FIGS. 25 and 26, respectively. First, an SCSI command is issued to select the error recovery log table 15 and the log chain table 16 (step S201).

A log chain 161 associated with a head number of an address at which an error recovery has been successfully conducted is taken out and whether the offset number that has been stored into the chain top 162 stored in that log chain 16 is other than 0×FF (step S202).

If the offset number is 0×FF, a new error recovery log 151 is registered. An LBA at which the error has occurred is assigned to LBA 152 of the new error recovery log 151 (step S207) and then a physical address associated with the error is assigned to a physical address 153 (step S208). Furthermore, a step number of the step of an error recovery procedure where the error recovery has been conducted is assigned to a step number 154 (step S209) and 1 is assigned to error recovery count 155 (step 210).

After that, 0×FF is assigned to the forward chain 201 to initialize the chain (step S211) and 0×FF is assigned to the backward chain 202 to initialize the chain (step S212). An offset of the registered new error recovery log 151 is assigned to the chain top 162 (step S213). A registration pointer 156 is updated (step S214) and a registration value 157 is incremented (step S215).

If the offset number stored within the chain top 162 is not 0×FF, reference pointer 158 is updated to the error recovery log 151 of the stored offset number within the chain top 162 (step 203).

It is judged in step 204 whether the step number that was registered in the internal step number 154 of the error recovery log 151 of the offset number stored within the chain top 162 matches the step number where the error recovery was conducted. If both step numbers match, the error recovery count 155 within the error recovery log 151 of the offset number stored in the chain top 162 is incremented (step 205). This is followed by updating/modifying the log chain table 16. Details of the updating/modifying of the log chain table 16 will be described later in this Specification.

If the step number registered in the step number 154 of the error recovery log 151 of the offset number stored in the chain top 162 does not match the step number where the error recovery was conducted, whether the error recovery log 151 being referred to is the end of the chain is judged in step S216. At this time, the chain tail 163 is used.

If the error recovery log 151 is not the end of the chain, control is returned to the immediate front of step S203. The reference pointer 158 is then updated to the error recovery log 151 of the offset number which was registered in the forward chain 201 of the error recovery log 151 of the stored offset number within the chain top 162 (step 203).

If the error recovery log 151 being referred to is the end of the chain, this indicates that the error recovery log 151 where the physical address 153 and the step number 154 match does not exist in the error recovery log table 15.

Next, the LBA at which the error occurred is registered in the internal LBA 152 of the new error recovery log 151 (step S217), and the physical address where the error occurred is registered in the physical address 153 (step S218). Also, the step number where the error recovery was successfully conducted is registered in the step number 154 (step S219), and 1 is assigned to the error recovery count 155 (step S220).

Since the error recovery count is a minimum value of 1, 0×FF is assigned to the forward chain 201 (step S221). An offset number of the error recovery log 151 last referred to is registered in the backward chain 202 (step S222). The offset number within the error recovery log 151 which was registered in the chain tail 163 is assigned (step S223).

When the error recovery count 155 in the error recovery log 151 is updated, the error recovery count 155 is referred to and the forward chain 201, the backward chain 202, the chain top 162, and the chain tail 163 are updated.

Figure 27:
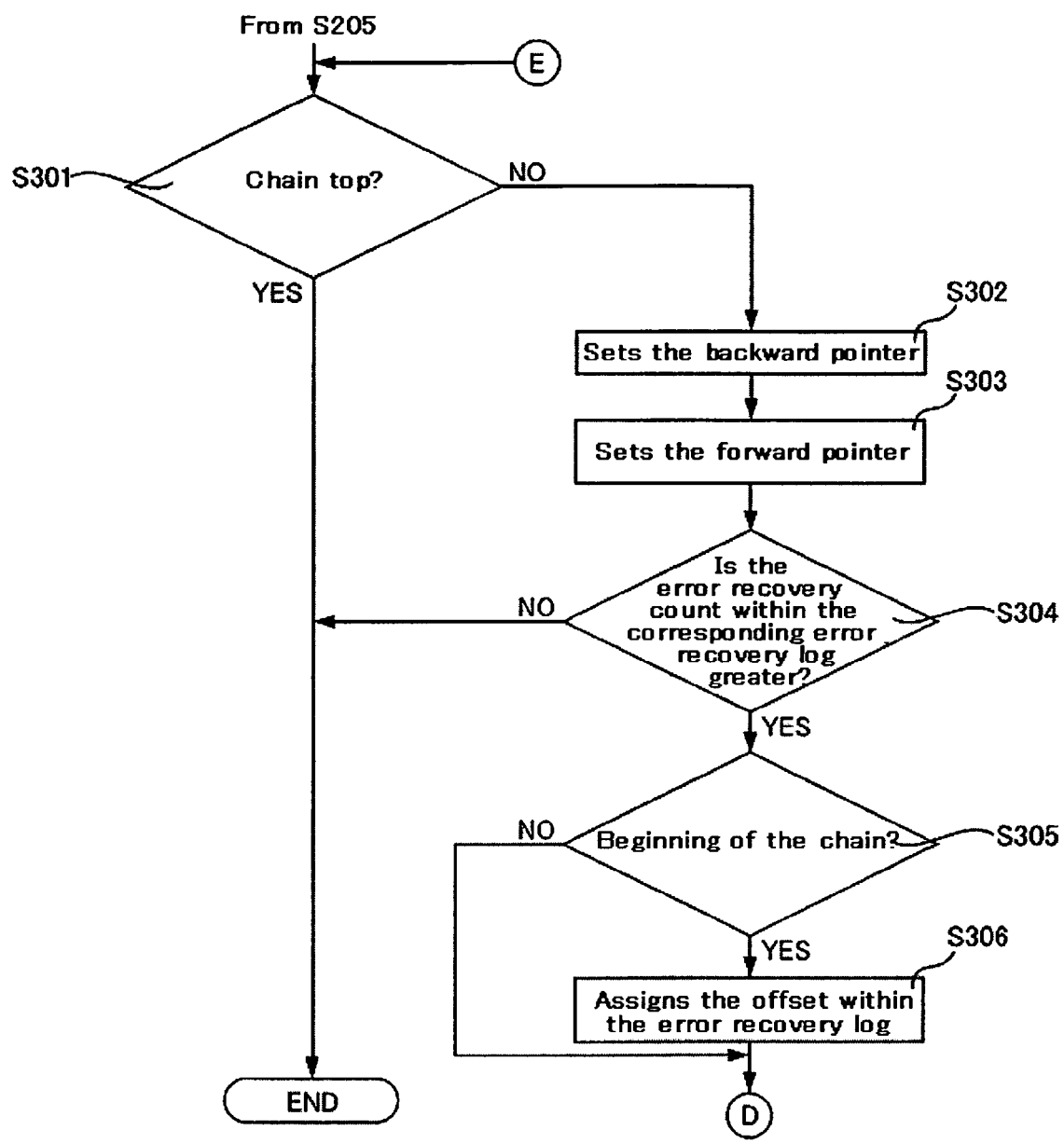
FIG. 27 is a flowchart showing a log chain updating/modifying process associated with error recovery count updating.
Figure 28:
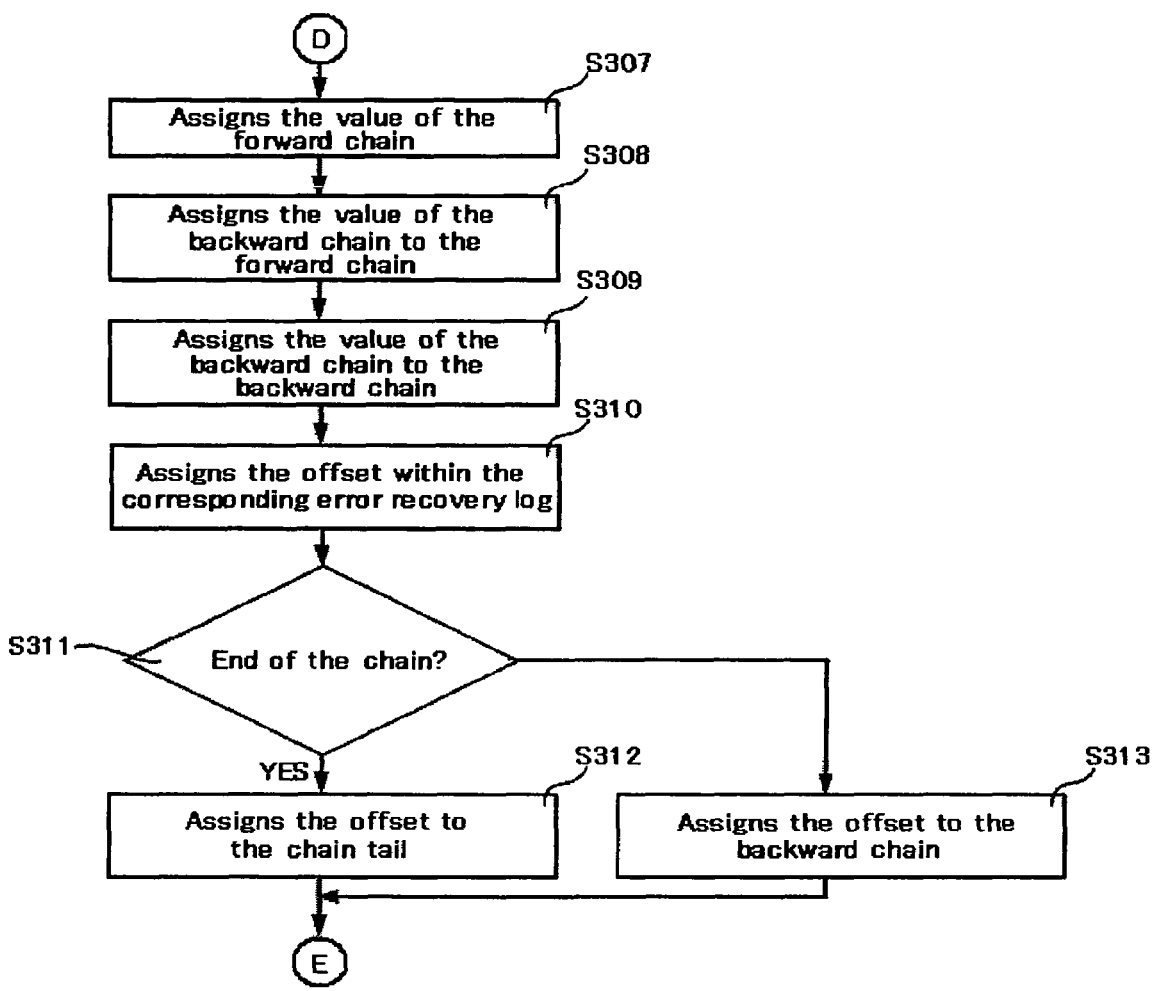
FIG. 28 is a flowchart showing another log chain updating/modifying process associated with error recovery count updating.

The log chain updating/modifying process step S206 executed when the error recovery count 155 is updated is shown in FIGS. 27 and 28. When each error recovery log 151 is referred to, the forward pointer 174 and backward pointer 175 that are temporary variables are used to allow reference to the error recovery log 151 that the forward chain 201 indicates, and the error recovery log 151 that the backward chain 202 indicates. The forward pointer 174 and the backward pointer 175 are temporarily arranged in the RAM 126.

First, it is judged in step S301 whether the error recovery log 151 where a match has been confirmed between the head number of the address at which the error was successfully corrected by the error recovery, and the step number of the error recovery procedural step in which the error was corrected, is the top of the chain (step S301). The judgment is made by checking for matching between the offset number registered in the chain top 162, and the corresponding error recovery log 151.

If the corresponding error recovery log 151 matches the offset number registered in the chain top 162, the updating/modifying process terminates since the value registered in the error recovery count 155 of the corresponding error recovery log 151 is a maximum.

If the corresponding error recovery log 151 does not match the offset number registered in the chain top 162, the backward pointer 175 is set in step S302 so that this pointer points the error recovery log 151 indicated by the backward chain 202. In step S303, the forward pointer 174 is set so that it points the error recovery log 151 indicated by the forward chain 201 of the corresponding error recovery log 151.

In step S304, a comparison is conducted between the value registered in the error recovery count 155 of the corresponding error recovery log 151, and the value registered in the error recovery count 155 of the error recovery log 151 indicated by the backward pointer 175.

If the value registered in the error recovery count 155 of the corresponding error recovery log 151 is smaller than the value registered in the error recovery count 155 of the error recovery log 151 indicated by the backward pointer 175, the updating/modifying process terminates since it is considered that the order of arrangement in the chain is not changed.

If the value registered in the error recovery count 155 of the corresponding error recovery log 151 is greater than the value registered in the error recovery count 155 of the error recovery log 151 indicated by the backward pointer 175, next process is conducted since it is considered that the order of arrangement in the chain is changed.

It is judged in step S305 whether the error recovery log 151 that the backward pointer 175 in the corresponding error recovery log 151 is the beginning of the chain. If the error recovery log 151 that the backward pointer 175 in the corresponding error recovery log 151 is the beginning of the chain, since the value registered in the error recovery count 155 of the corresponding error recovery log 151 is greater than the value registered in the error recovery count 155 indicated by the backward pointer 175, the corresponding error recovery log 151 is placed at the top of the chain. Accordingly, the offset number of the corresponding error recovery log 151 is assigned to the chain top 162 (step S306).

After that, in step S307, the value that was registered in the forward chain 201 of the corresponding error recovery log 151 is assigned to the forward chain 201 of the error recovery log 151 indicated by the backward pointer 175.

The value of the backward chain 202 is assigned to the forward chain 201 of the corresponding error recovery log 151 (step S308). The value of the backward chain 202 of the error recovery log 151 indicated by the backward pointer 175 is assigned to the backward chain 202 of the corresponding error recovery log 151 (step S309).

In step 310, the offset number of the corresponding error recovery log 151 is assigned to the backward chain 202 of the error recovery log 151 indicated by the backward pointer 175. Based on the above, a change is made to the order of the corresponding error recovery log 151 in the chain.

Next, it is judged in step S311 whether the corresponding error recovery log 151 is the end of the chain. If the corresponding error recovery log 151 is the end of the chain, the error recovery offset number that the backward pointer 175 indicates is assigned to the chain tail 163 (step S312). Control proceeds to the immediate front of step S301 after that.

If the corresponding error recovery log 151 is not the end of the chain, the offset number of the error recovery log 151 indicated by the backward pointer 175 is, in step S313, assigned to the backward chain 202 within the error recovery log 151 indicated by the forward pointer 174. Control proceeds to the immediate front of step S301 after that.

In the manner described above, the forward chain 201, the backward chain 202, the chain top 162, and the chain tail 163 are updated so that each error recovery log 151 can be referred to in order of the magnitude of the value registered in the error recovery count 155 for the same head.

If a data write error or a data read error occurs, the chain top 162 of the corresponding head number and the forward pointer 174 of the error recovery log 151 are referred to, then step numbers are selected in order of the magnitude of the value registered in the error recovery count 155, and steps of the error recovery are executed. If executing the step number within the error recovery log 151 indicated by the chain tail 163 does not correct the error, the steps of the error recovery that have not been executed until that time are executed in numerical order of the step number.

Also, in the present embodiment, either a head number, a combination of a head number, a cylinder number, and a cylinder offset, or a zone number can be selected as the address registered in the physical address 153.

It becomes possible, by doing in the above way, to conduct error recovery in order of the magnitude of the value registered in the error recovery count 155. Also, conducting error recovery in order of the magnitude of the value registered in the error recovery count 155 allows an error recovery procedure to be started from a step in which, if an error occurs, error recovery is most likely to succeed. Thus, efficient error recovery becomes possible.

Another usable method would be by retaining in the RAM 126 a storage matrix of independent error recovery counts in each error recovery step for each head number and updating the error recovery count of this matrix that is associated with the step number of the error recovery step when successfully executed.

Yet another possible method would be by, if a data read/write error occurs, executing error recovery steps in order with the step of the largest error recovery count first.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage device for conducting an error recovery process for a data access error in accordance with an error recovery procedure having a plurality of error recovery steps, said data storage device comprising:
    a head that accesses a data region of a medium for storage of user data; and
    a controller that controls the error recovery process for an access error to the data region, by using not only address information of a sector at which the access error has occurred, but also an error recovery log which has address information of the data region and past error recovery information associated with the address information of the data region,
    wherein the error recovery log comprises a write error recovery log and a read error recovery log.

2. The data storage device according to claim 1, further having a plurality of heads, wherein:
    said controller uses the same error recovery log with respect to a sector of the same head number.

3. The data storage device according to claim 1, further having a plurality of heads, wherein:
    said controller uses the same error recovery log with respect to a sector of the same head number and cylinder number region.

4. The data storage device according to claim 1, wherein said controller uses the same error recovery log with respect to a sector of the same zone.

5. The data storage device according to claim 1, wherein:
    the error recovery log includes identification information on the latest error recovery step taken to successfully accomplish error recovery; and
    said controller conducts control such that the latest error recovery step included in the error recovery log is first executed for an access error to a sector associated with the error recovery log.

6. The data storage device according to claim 1, wherein:
    the error recovery log includes identification information on an error recovery step, and a past error recovery count of this error recovery step; and
    said controller determines, by using an error recovery count included in the error recovery log, execution order of error recovery steps for an access error to a sector associated with the error recovery log.

7. The data storage device according to claim 6, wherein said controller sets the error recovery step of the largest error recovery count, as a step to be executed first in the order of execution.

8. The data storage device according to claim 6, wherein said controller determines execution order of error recovery steps in order of a magnitude of an error recovery count.

9. The data storage device according to claim 1, wherein:
    said controller judges whether the access to the data region is access to a plurality of continuous sectors, and if the access to the data region is access to a plurality of continuous sectors, controls the error recovery process in accordance with the execution order of error recovery steps that is registered in an associated state with respect to the access to the plurality of sectors, or if the access to the data region is not access to a plurality of continuous sectors, controls the error recovery process by using not only address information on the access sectors, but also the error recovery log.

10. A method for conducting an error recovery process for a data access error in accordance with an error recovery procedure having a plurality of error recovery steps, said method comprising:

storing an error recovery log that has address information of a use data storage data region and past error recovery information associated with the address information; and determining execution order of error recovery steps by using not only address information of a sector at which an access error to the data region has occurred, but also the error recovery log, wherein the error recovery log comprises a write error recovery log and a read error recovery log.

11. The error recovery method according to claim 10, wherein said determining uses the same error recovery log with respect to a sector of the same head number.

12. The error recovery method according to claim 10, wherein said determining uses the same error recovery log with respect to a sector of the same head number and cylinder number region.

13. The error recovery method according to claim 10, wherein said determining uses the same error recovery log with respect to a sector of the same zone.

14. The error recovery method according to claim 10, wherein:

the error recovery log includes identification information on the latest error recovery step taken to successfully accomplish error recovery; and the latest error recovery step included in the error recovery log is first executed for an access error to a sector associated with the error recovery log.

15. The error recovery method according to claim 10, wherein:

the error recovery log includes identification information on an error recovery step, and a past error recovery count of this error recovery step; and execution order of error recovery steps for an access error to a sector associated with the error recovery log is determined using an error recovery count included therein.

16. The error recovery method according to claim 15, wherein the error recovery step of the largest error recovery count is set as a step to be executed first in the order of execution.

17. The error recovery method according to claim 15, wherein execution order of error recovery steps is determined in order of a magnitude of an error recovery count.

18. The error recovery method according to claim 10, further comprising:

judging whether the access to the data region is access to a plurality of continuous sectors; and if the access to the data region is access to a plurality of continuous sectors, conducting the error recovery process in accordance with the execution order of error recovery steps that is registered in an associated state with respect to the access to the plurality of sectors, or if the access to the data region is not access to a plurality of continuous sectors, conducting the error recovery process by using not only address information on the access sectors, but also the error recovery log.

* * * * *